(12) United States Patent
Niichel

(10) Patent No.: US 10,442,109 B2
(45) Date of Patent: Oct. 15, 2019

(54) SAFETY DEVICE FOR POWER CUTTING TOOLS

(71) Applicant: William Niichel, Pueblo West, CO (US)

(72) Inventor: William Niichel, Pueblo West, CO (US)

( * ) Notice: Subject to any disclaimer, the term of this patent is extended or adjusted under 35 U.S.C. 154(b) by 0 days.

(21) Appl. No.: 15/975,529

(22) Filed: May 9, 2018

(65) Prior Publication Data
US 2018/0257255 A1    Sep. 13, 2018

Related U.S. Application Data

(60) Continuation-in-part of application No. 15/272,193, filed on Sep. 21, 2016, now Pat. No. 10,245,754, (Continued)

(51) Int. Cl.
*B27G 19/02* (2006.01)
*B23D 59/00* (2006.01)
(Continued)

(52) U.S. Cl.
CPC .............. *B27G 19/02* (2013.01); *B23D 59/00* (2013.01); *B26D 7/22* (2013.01); *B27B 25/10* (2013.01); *B27B 27/02* (2013.01); *B27C 5/06* (2013.01); *B27G 21/00* (2013.01); *Y10T 29/49716* (2015.01); *Y10T 83/6572* (2015.04); *Y10T 83/6638* (2015.04); *Y10T 83/744* (2015.04); *Y10T 83/745* (2015.04); *Y10T 83/747* (2015.04)

(58) Field of Classification Search
CPC ...... B27G 19/02; B23D 59/00; B23D 45/042; B23D 45/044; B23D 45/048; B23D 47/00; B23D 47/02; B23D 47/025; B23D 47/04; B23D 47/047; B23D 7/00; B23D 7/08; B26D 7/22; B26D 7/01; B27B 25/06; B27B 25/10; B27B 5/29; B27B 27/02; B27C 5/06; Y10T 83/7693; Y10T 83/7697; Y10T 83/7788; Y10T 83/8773; Y10T 83/7734; Y10T 83/606; Y10T 83/7726; Y10T 83/745; Y10T 83/6572; Y10T 83/744; Y10T 83/747; Y10S 83/01
See application file for complete search history.

(56) References Cited

U.S. PATENT DOCUMENTS

| | | |
|---|---|---|
| 13,354 A | 7/1855 | Hull |
| 2,039,699 A | 5/1936 | Biazzi |
| (Continued) | | |

OTHER PUBLICATIONS

"Sawing Small Pieces Safely," Popular Science, Jul. 1947, vol. 151, No. 1, p. 198.
(Continued)

*Primary Examiner* — Evan H Macfarlane
(74) *Attorney, Agent, or Firm* — Sheridan Ross P.C.

(57) ABSTRACT

A safety system for powered cutting tools includes a miter saw safety device. Embodiments of the miter saw safety device may be positioned on one or both sides of the rotating saw blade and include a pivotable support arm and a support plate that is repositionable relative to the support arm. In some embodiments the support plate is biased toward the guide fence of the miter saw. The device enhances the capabilities of miter saw to make precise cuts safer, faster and easier.

27 Claims, 40 Drawing Sheets

Related U.S. Application Data which is a division of application No. 14/582,893, filed on Dec. 24, 2014, now Pat. No. 9,486,935.

(51) Int. Cl.
*B26D 7/22* (2006.01)
*B27B 25/10* (2006.01)
*B27B 27/02* (2006.01)
*B27G 21/00* (2006.01)
*B27C 5/06* (2006.01)

(56) References Cited

U.S. PATENT DOCUMENTS

| | | | |
|---|---|---|---|
| 2,522,965 A | 9/1950 | Schaufelberger | |
| 2,711,020 A | 6/1955 | Hastings | |
| 2,722,247 A | 11/1955 | Schroeder et al. | |
| 3,101,104 A | 8/1963 | Sullivan | |
| 3,738,403 A | 6/1973 | Schwoch et al. | |
| 4,026,173 A | 5/1977 | Livick | |
| 4,469,318 A | 9/1984 | Slavic | |
| 4,485,711 A | 12/1984 | Schnell | |
| 4,603,612 A | 8/1986 | Atkins | |
| 4,976,298 A | 12/1990 | Gibson | |
| 5,058,474 A | 10/1991 | Herrera | |
| 5,148,846 A | 9/1992 | Van Gelder | |
| 5,341,711 A | 8/1994 | Stay, Jr. et al. | |
| 5,595,102 A | 1/1997 | O'Grady | |
| 5,755,148 A | 5/1998 | Stumpf et al. | |
| 5,913,509 A | 6/1999 | Price et al. | |
| 6,557,601 B1 | 5/2003 | Taylor | |
| 7,000,519 B1 | 2/2006 | Weinstein et al. | |
| 7,140,286 B2 | 11/2006 | Schwartz | |
| 7,341,081 B1 | 3/2008 | Villiger | |
| 7,730,914 B2 | 6/2010 | Lin | |
| 8,371,198 B2 | 2/2013 | Babine | |
| 8,763,502 B2 | 7/2014 | Smith | |
| 8,826,788 B2 | 9/2014 | Rybka | |
| 9,346,184 B2 | 5/2016 | Niichel | |
| 9,486,935 B2 | 11/2016 | Niichel | |
| 2002/0029822 A1 | 3/2002 | Jukoff | |
| 2006/0101965 A1* | 5/2006 | Carroll | B27G 19/02 83/397 |
| 2006/0185485 A1 | 8/2006 | Wang | |
| 2006/0201297 A1 | 9/2006 | Friend | |
| 2006/0288835 A1 | 12/2006 | Gregoire | |
| 2009/0205474 A1* | 8/2009 | Liu | B23D 45/044 83/435.13 |
| 2009/0224454 A1* | 9/2009 | Liu | B23D 47/04 269/182 |
| 2012/0031247 A1 | 2/2012 | Wang | |
| 2012/0032382 A1* | 2/2012 | Hendrickson | B23D 47/04 269/86 |
| 2012/0118120 A1 | 5/2012 | Niichel | |
| 2012/0312471 A1 | 12/2012 | Harbaugh et al. | |
| 2013/0048149 A1 | 2/2013 | Liu | |
| 2014/0318341 A1* | 10/2014 | Fait | B23D 47/04 83/477 |
| 2017/0008190 A1 | 1/2017 | Niichel | |

OTHER PUBLICATIONS

"Table Saw Safety Devices," retrieved from web.archive.org/web/20140923213829/http://tablesawaccidents.com/new-page-3.htm, Sep. 23, 2014, 2 pages.
Restriction Requirement for U.S. Appl. No. 13/295,813, dated Nov. 19, 2013 7 pages.
Official Action for U.S. Appl. No. 13/295,813, dated Apr. 1, 2014 9 pages.
Final Action for U.S. Appl. No. 13/295,813, dated Aug. 13, 2014 10 pages.
Restriction Requirement for U.S. Appl. No. 14/070,117, dated Oct. 21, 2014 10 pages.
Official Action for U.S. Appl. No. 14/070,117, dated Jan. 26, 2015 12 pages.
Notice of Allowance for U.S. Appl. No. 14/070,117, dated Aug. 7, 2015 9 pages.
Notice of Allowance for U.S. Appl. No. 14/070,117, dated Nov. 17, 2015 10 pages.
Notice of Allowance for U.S. Appl. No. 14/070,117, dated Mar. 16, 2016 10 pages.
Official Action for U.S. Appl. No. 14/582,893, dated Jun. 24, 2015 16 pages.
Final Action for U.S. Appl. No. 14/582,893, dated Oct. 15, 2015 28 pages.
Official Action for U.S. Appl. No. 14/582,893, dated Jan. 13, 2016 25 pages.
Notice of Allowance for U.S. Appl. No. 14/582,893, dated Jun. 23, 2016 13 pages.
Official Action for U.S. Appl. No. 15/272,193, dated Sep. 19, 2017 21 pages.
Official Action for U.S. Appl. No. 15/272,193, dated May 14, 2018, 20 pages.

* cited by examiner

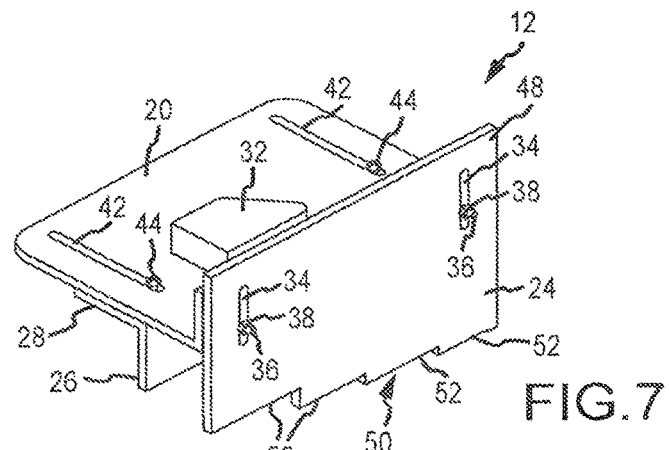
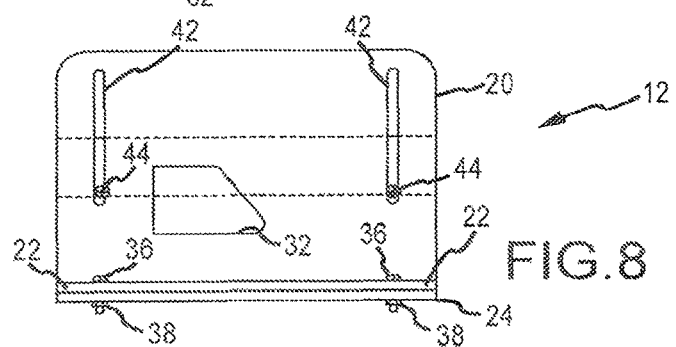
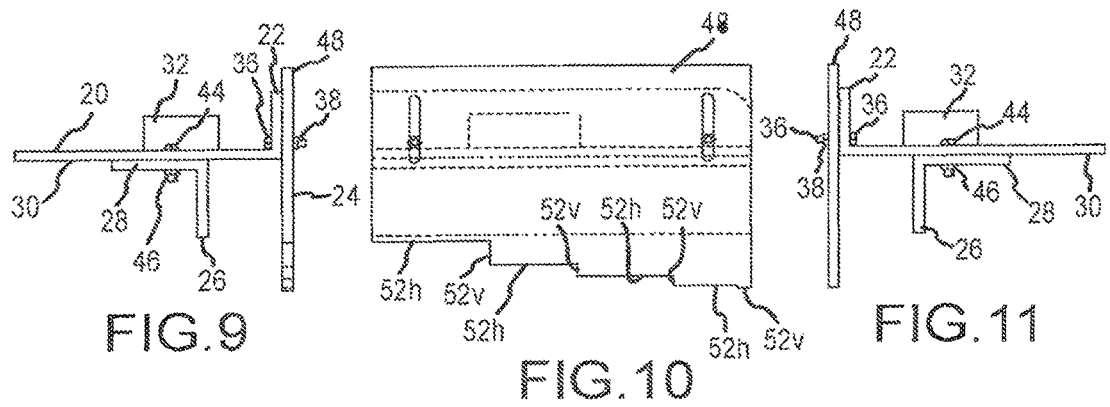
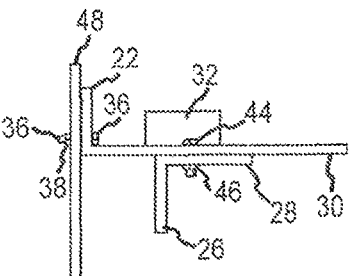

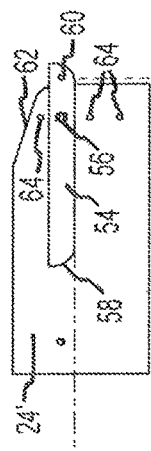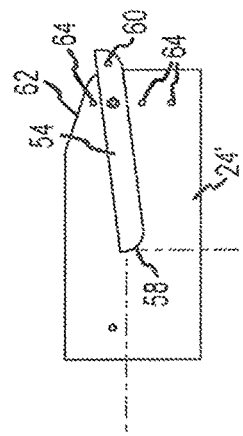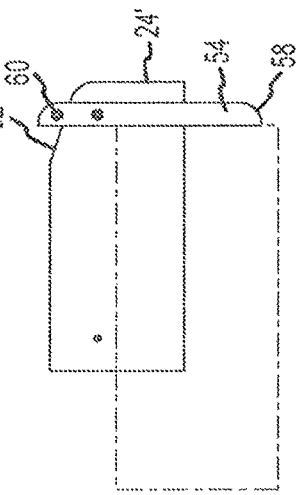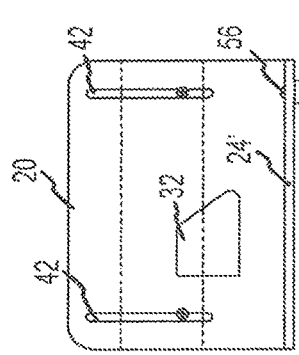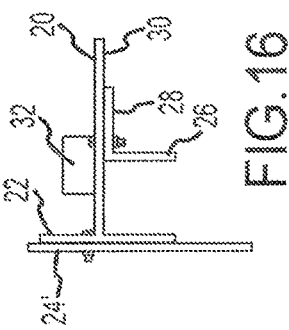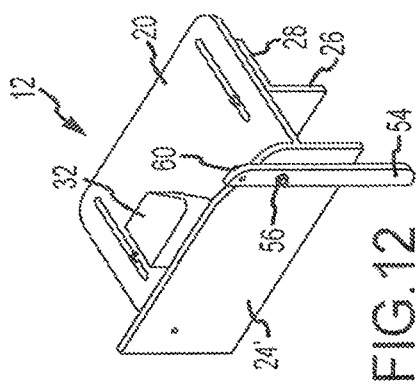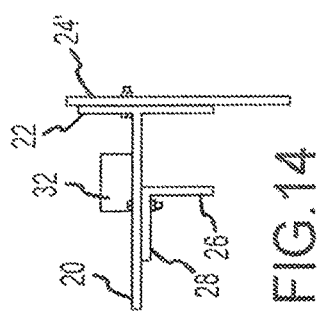

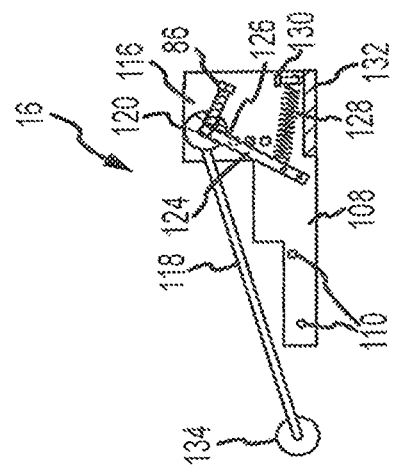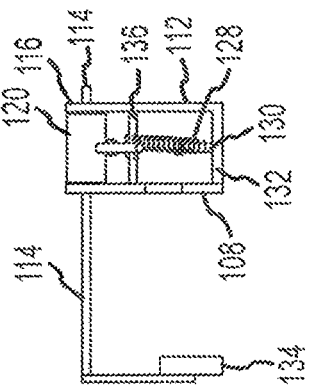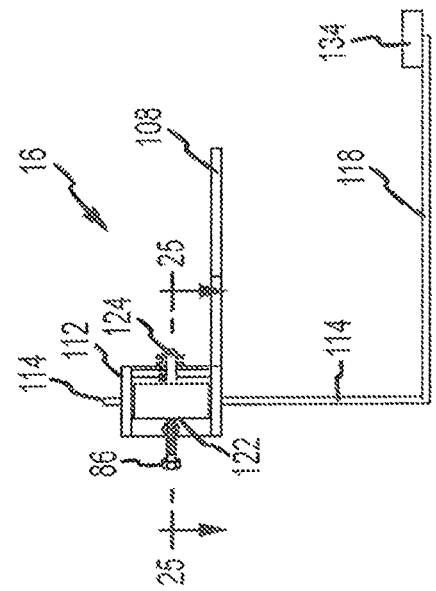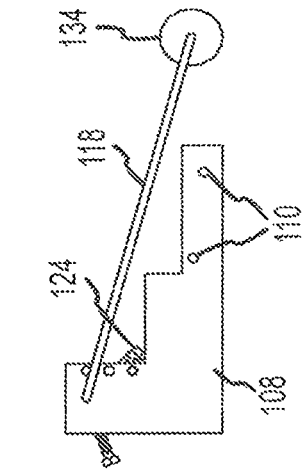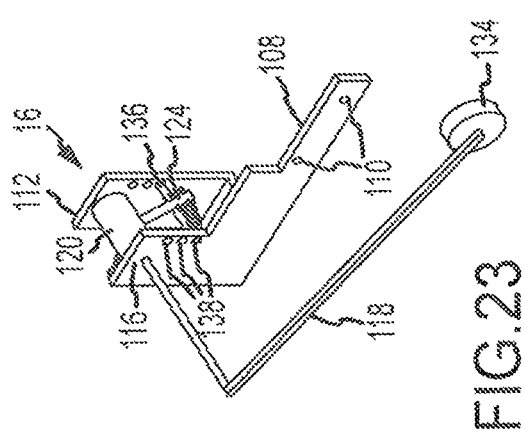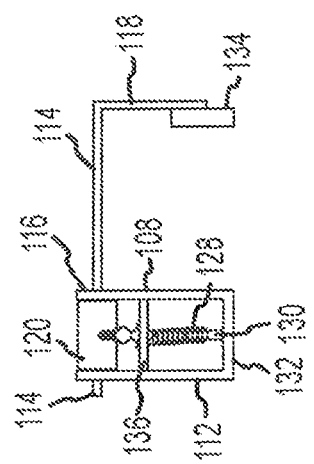

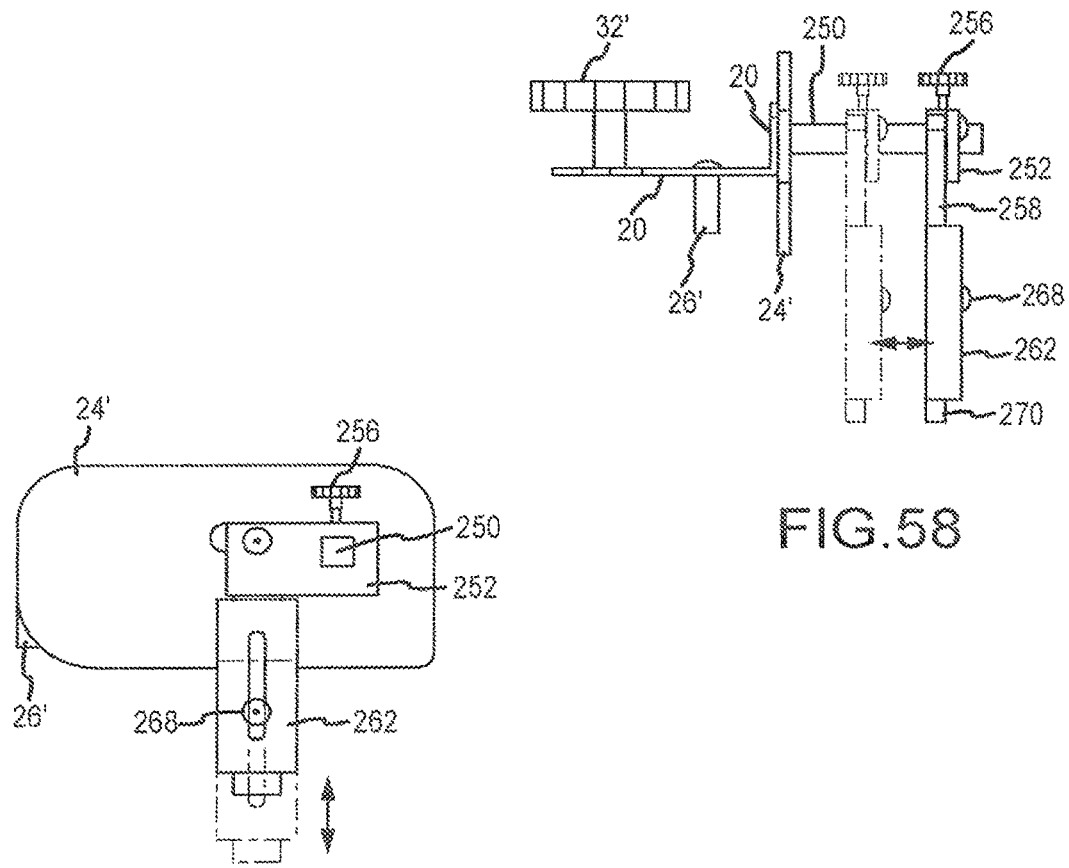
FIG.58
FIG.59
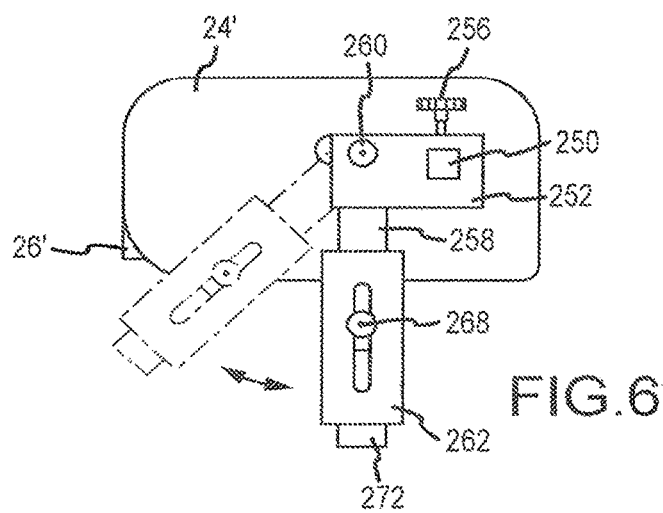
FIG.60

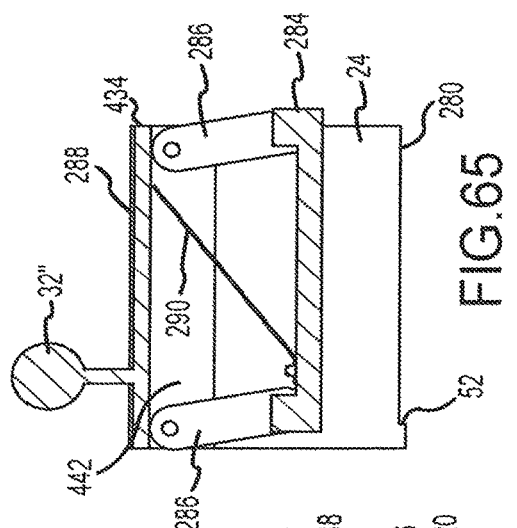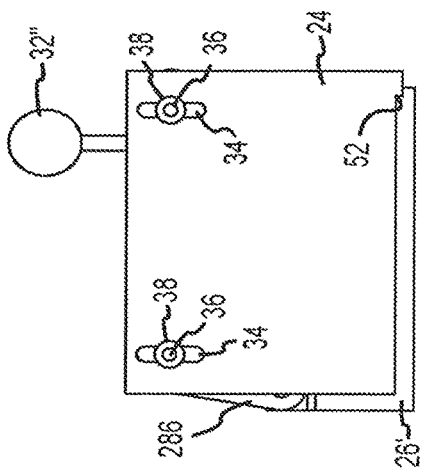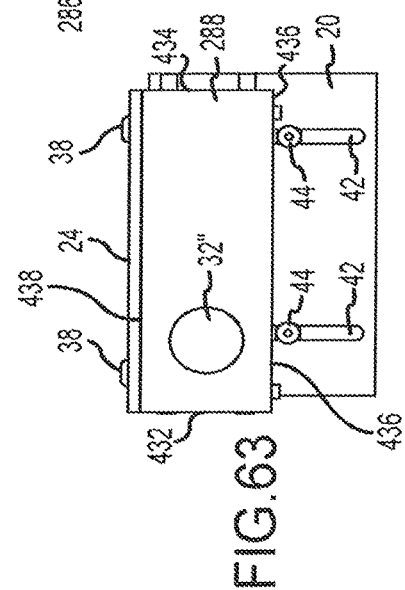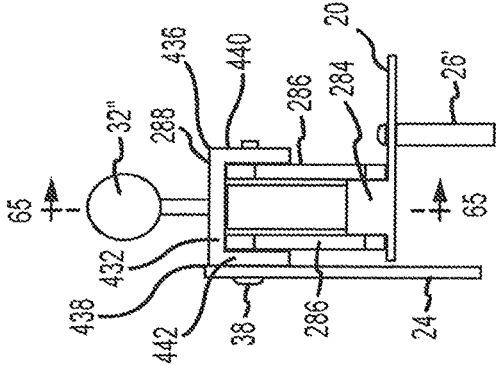

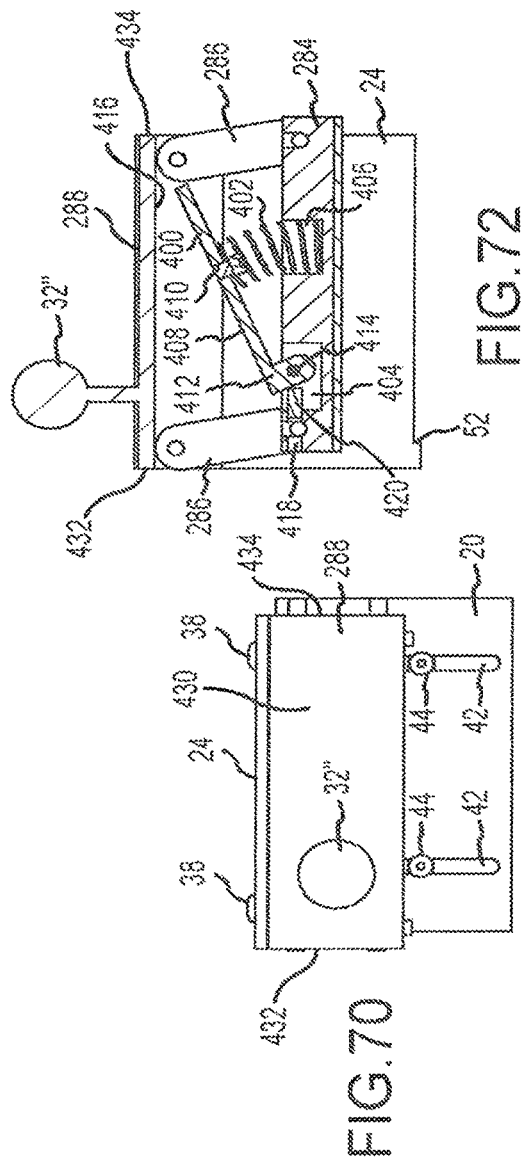
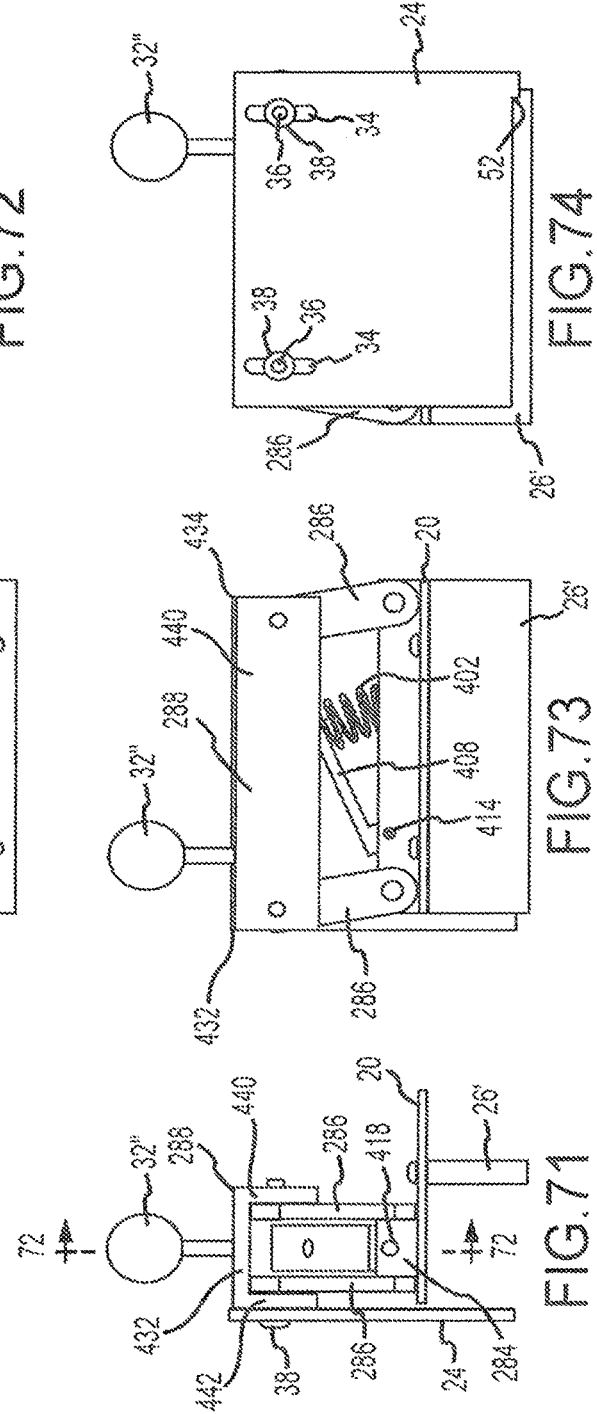

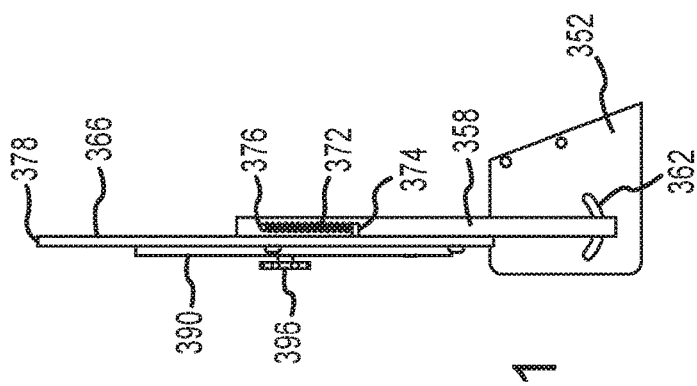
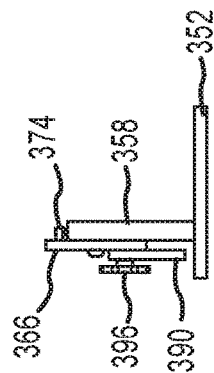
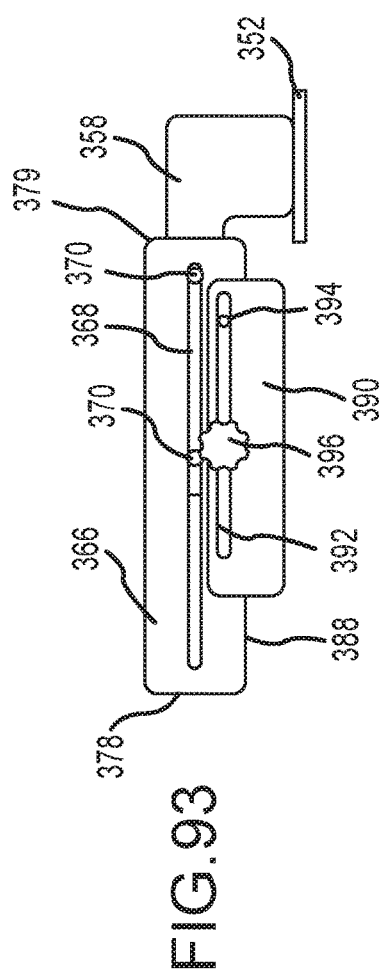

SAFETY DEVICE FOR POWER CUTTING TOOLS

CROSS REFERENCE TO RELATED APPLICATIONS

The present application is a continuation-in-part application of U.S. patent application Ser. No. 15/272,193, filed Sep. 21, 2016; which is a divisional application of U.S. patent application Ser. No. 14/582,893 filed Dec. 24, 2014, now U.S. Pat. No. 9,486,935, entitled Safety Devices for Powered Cutting Tools.

The present application claims priority to each of the preceding identified applications, and the entirety of each are incorporated herein by this reference.

FIELD OF THE INVENTION

The present invention relates to a safety system for powered cutting tools, primarily table saws, router tables, miter saws and planers/jointers. The system comprises a number of component devices that, alone or in combination, provide enhanced safety and reduce or eliminate injuries to an operator of the equipment. The devices attach to or are used with a frame or table associated with a powered cutting tool and are adapted for securing work pieces during a cutting operation, protecting the operator's hands and arms and, in some instances, simultaneously improving the versatility and use of the cutting tool.

BACKGROUND OF THE INVENTION

Power cutting tools having a rotating blade or cutting element, such as table saws, miter saws, routers, jointers and shapers, are dangerous. Thousands of operators of these types of cutting tools are severely injured every year. According to data from the United States Consumer Products Safety Commission, roughly 31,000 people are treated in emergency rooms every year for table saw injuries. It is believed that injuries resulting from use of table or cabinet-based power cutting tools other than table saws are equally significant, statistically and in the nature of the injury to the operator, but are not well reported because fewer people own and use such equipment. The physical injury and trauma to an operator's hand and/or fingers is often significant. Injuries occur due to several factors, including lack of understanding by the operator of the equipment and/or characteristics of the wood being cut, inattentiveness, fatigue, work piece kickback and misuse of or misplaced reliance on accessory devices such as push sticks, feather boards, splitters and kerf blades.

As wood is cut, particularly with a table saw, preexisting stresses in the wood are released. The partially cut work piece may move, twist, or bend and the gap or kerf between the cut portions of the wood close together before the work piece is fully cut. With the two separate halves pressing together at the rear of the blade where the saw teeth of the blade are rising up from the table or supporting surface, a work piece can be thrown forwards toward the operator as a projectile. This event is termed a kickback. A second form of kickback may occur if the saw's rip fence or guide fence is misadjusted so as to be slightly closer to the rear of the blade than the front, rather than being parallel to the blade. In this case, the fence can push the wood into the saw blade, leading to a similar result. Splitters and stationary blades mounted behind a rotating saw blade are one type of tool designed to prevent or reduce kickback. However, in practice, such devices do not prevent all cases of kickback and do not address non-kickback related injuries. Moreover, they are limited to use solely with table saws and not other type of powered cutting tools.

The operator can be seriously injured by the thrown work piece. However, serious injury also results to the operator's hand and/or fingers because, prior to the kickback event, the operator is pushing the work piece toward the rotating cutting tool. With the momentum of the pushing motion directed toward the cutting tool, and with the work piece suddenly removed or its physical position unexpectedly altered, the operator's hands can be thrust into the cutting tool. Similar situations can occur when the operator is using accessory aids and when the operator is cutting small pieces of wood with his/her hands positions closely to the cutting tool.

There are different types of cuts performed by powered cutting tools. One type is ripping. A rip cut is performed on a table saw by passing the wood between the blade and a rip fence parallel to the grain of the wood. A cross-cut is the same, but is performed across the grain of the wood. Another type of cut is mitering, and is performed by a specialized miter saw where the blade may be repositioned at an angle relative to the work piece. Mitering is an angle cross-cut. Another type of cut is beveling. Most bevels are rip cuts using a rip fence as a guide with the blade or table tilted to achieve the required angle. Bevel cuts may be made on a miter saw or a table saw. Another type of cut is a dado. A dado cut is done by setting a table saw blade to a cutting depth less than the thickness of the work piece to form a u-shaped cut or groove in the work piece. The dado cut does not go entirely through the work piece. Routing also involves cutting a groove in a work piece. A jointer or shaper cuts or shaves an entire surface of a work piece, such as an edge, to remove or reduce a bow or curve in the work piece. Serious injuries can occur with each of these devices. While all of these devices are different, each has a cutting zone which is the area proximate the moving blade or cutting instrument.

Attempts to develop safety devices for powered cutting tools have been made with limited success. For example, the website www.tablesawaccidents.com shows three safety devices which have limited applicability and usefulness. The device identified as Hand Guard, is a work piece pusher for use in connection with a table saw. It provides a single notch or cut-out at its base which has an adjustable depth to accommodate work pieces of different thicknesses. However, this device is positioned between the saw blade and the guide fence when used. No protection is provided to the operator's hand and use of this device requires the operator's hand to pass by the rotating saw blade. It also limits the narrowness of a cut that can be made on a table saw due to its own width. A second similar device is also shown under the name Push Block. While it saddles and moves along a rip fence, it also provides no protection for the user's hand and only includes a single notch to accommodate a single work piece thickness. In addition, it is not adjustable to accommodate use with guide fences of different sizes and shapes. Further still, an anti-kickback roller device is shown. The device applies a downward pressure on the work piece. As illustrated, one device may be placed before the cutting blade and one positioned following the cutting blade. When deployed in this manner, the devices prevent the use of other needed safety devices, including a work piece pusher and hold down device. Indeed, the Hand Guard and Pusher Block devices depicted on the same web page could not be used with the anti-kickback devices as the forward anti-kickback device prevents the any type of pusher device from moving the work piece completely past the saw blade. It also appears that the post cut anti-kickback device requires the operator to manually lift and position the roller on the work piece, bringing the operator's hand dangerously close to the moving saw blade. Yet another safety device used with table saws is sold under the name SAWSTOP by SawStop, LLC of Tualatin, Oreg. This device is designed to cause a table saw blade to quickly stop, with no injury to an operator's hand. However, this device costs hundreds of dollars and is not designed to be retrofit with existing table saws. Further still, all of the foregoing devices are designed and intended to be used with table saws and do not address the significant and serious injuries created with miter saws, routers, jointers and shapers.

SUMMARY OF THE INVENTION

Accordingly, a novel system, devices, and methods are disclosed herein for safely operating powered cutting tools.

In one embodiment, the present invention contemplates a selectively positionable device for securing a work piece while also positioning a user's left hand at a safe distance away from the cutting zone, namely, the area proximate the rotating blade of a table saw, and providing protection in the event the user's hand were to inadvertently move toward an active blade. The device is secured to the base, frame or table top of the table saw while also being selectively positionable relative to the cutting tool to permit necessary positioning and movement of the work piece relative to and at different orientations to the cutting blade while simultaneously holding down the work piece to reduce kickback and providing protection for the operator's left hand. In one embodiment the device comprises a base that is rotatably secured to the table top of the cutting tool. A leading or front portion of the device that engages the work piece is provided with a series of stepped surfaces or shoulders to accommodate work pieces of different thickness. The device pivots or rotates to facilitate positioning relative to the work piece regardless of the size of the work piece. Rotation of the device allows constant contact with the work piece. It holds the work piece against the rip fence and holds it down against the surface of the table saw. Complete control of the work piece is provided. A physical stop is also provided such that the device cannot move into contact with the blade of the cutting tool nor cause the work piece to be pinched against the cutting tool and create a kickback.

In another embodiment also designed for use with a table saw and intended to be used in combination with the previously described left hand device, a device is provided which is also designed to hold down the work piece at a different location and, at the same time, push the work piece past the saw blade quickly and safely. The safety device fits over or saddles the rip or guide fence and slides forward to push the work piece through the cutting zone and past the rotating blade. In a first embodiment, the device generally comprises a left wall, a top wall and a right wall. The left wall and right wall are spaced apart slightly more than the width of a rip fence. The top wall is attached to the left and right walls and slides along the top of the rip fence. A handle is provided to be grasped by an operator. In one embodiment, the left wall extends vertically above the top wall and handle to protect the operator's hand from the saw blade in the event of an unexpected kickback or other accident or mistake. The lower portion of the left wall is formed with a series of stepped or increasingly large cut-outs. The cut-outs are designed to accommodate work pieces of different thickness. It should be appreciated by those of skill in the art that the cut-outs may be dimensioned in any number or variety of different sizes to accommodate work pieces of different thickness. There also may be more or fewer than four cut-outs. In a further alternative embodiment, the device may also be constructed in an adjustable version that allows adjustment of the left wall relative to the top and right wall to accommodate use with work pieces of different thicknesses by altering the position of the cut outs relative to the cutting surface.

A further embodiment of the safety device described in the prior paragraph is more fully adjustable. Here, the relative position of the component pieces are adjustable to accommodate rip fences of different dimensions.

A still further embodiment of the right hand hold down and pusher concept described in the prior two paragraphs is one that incorporates a swing arm push element for engaging the work piece and is designed primarily for use with a router, jointer and/or shaper, in addition to a table saw. Here, instead of using a left wall with a series of one or more cutouts, a swing arm is affixed to the left wall and permits a work piece to initially pass underneath the swing arm, rotating the swing arm to a position on top of the work piece. Once the work piece passes completely underneath the swing arm, the swing arm rotates to a generally vertical position where it engages the rear or trailing edge of the work piece, allowing the operator to completely push the work piece past the cutting element in a safe manner protecting the right hand of the operator. The position of the swing arm is adjustable to accommodate work pieces of different height or thickness.

In yet a further embodiment of a right hand hold down and pusher concept, a biasing member is provided to bias or lift the work piece contact portion of the pusher to a position spaced from the surface of the cutting instrument when not in use. This permits new work pieces to be positioned on the surface of the cutting tool without having to remove or reposition the right hand hold down device. For example, following use in cutting a board with a table saw, the device remains on the guide fence at a position near the leading edge of the table. When the operator releases his or her grasp of the device, the biasing member will lift the work piece contact surface, whether that is a single notch or multiple notches on the base of the safety wall or a swing arm or some other engagement surface known to those of skill in the art and useable with devices of this type. In turn, this permits a new work piece to be placed on the work surface without having to remove, reposition or lift the right hand pusher device from the guide fence as the work piece will slide underneath the pusher device. The user may then press the device against the new work piece causing the biasing member to deflect and the pusher to engage the work piece.

Yet another embodiment of safety devices described herein is for use with table saws, for example, in making dado cuts. A dual bearing hold down device is provided with two separate bearing elements that press the work piece in two directions to safely secure the work piece and eliminate work piece kickback. A first bearing element presses the work piece against the guide rail or rip fence, and a second bearing element presses the work piece in a perpendicular direction against the surface of the cutting table. Both bearing elements are biased against the work piece and the biasing force is adjustable. Additionally, the device itself is positionally adjustable to accommodate work pieces of different sizes. Further still, the bearing arm that positions the second bearing element may comprise different lengths to position the second bearing element at different locations relative to the cutting element, thereby facilitating a variety of different cuts and use with different blades as the situation may require. In a preferred embodiment, at least the first bearing element is configured to apply a force against the work piece at an acute angle relative to the engaged surface of the work piece. Also in a preferred embodiment, at least the first bearing element comprises an arm having two portions interconnected at an angle relative to each other such that the bearing element is curved or bent. Preferably, the arm will pivot against a counteracting biasing force to secure the work piece against the guide fence.

The dual bearing hold down device may also be utilized in connection with a table saw, jointer, planer, shaper or router. In one embodiment, the dual bearing hold down device comprises a base plate that covers a substantial portion of the rotating cutting element, thereby eliminating any opportunity for the operator's hand to accidentally contact the cutting element. In a second embodiment, the base plate may be positioned adjacent a table saw blade.

In a further alternative embodiment, the hold down device may be configured in the form of a triple bearing device where two bearing members press the work piece against the guide fence and a third bearing member presses the work piece against the surface of the cutting tool. Additional bearing elements for applying pressure against and securing a work piece may be added as would be understood by those of skill in the art upon review of this disclosure.

A further embodiment of the present invention comprises an anti-kickback wheel. This device is contemplated primarily for use with table saws, but may also be used with other devices. In connection with table saws, the device includes a bracket or base designed to attach at or near the distal end of the guide fence with a wheel that rides on top of the work piece to provide pressure holding the work piece against the surface of the table saw and against the rip fence, greatly reducing the chance of kickback. The freely rotating wheel is adjustably positionable by a wheel bearing arm to accommodate work pieces of different thicknesses and widths and to apply adjustable pressure, as needed. The larger the diameter of the wheel, the more readily the wheel automatically engages and rides over the top of a work piece without the need for an operator to manually position the hold down wheel on the work piece, thereby eliminating the need for the operator's hand to be located near a rotating cutting instrument. The wheel bearing arm is also designed to move completely out of the way without having to dismount or disconnect the device from the equipment.

Another embodiment of the safety system components comprises a device which is used with a miter saw and is designed to secure a work piece in a position to achieve an intended cut while protecting the operator's hand against injury. In one embodiment, the device is securable to the base or table of the miter saw. The device is rotatable about an axis in a plane generally parallel to the work surface or table surface of the saw. Securing means is provided to securely position the device in a desired position with respect to the saw and work piece. In a preferred embodiment, the device further comprises a planer body having an upper surface and a lower surface. The lower surface contacts the work piece and the upper surface is engaged by the user for applying downward pressure on the work piece. An upstanding safety wall is associated with or positioned on the upper surface for preventing or limiting a user's reflexive or unintentional movement of his/her left hand into the cutting area. The lower surface may also comprise a subtending guide member that provides a second surface to engage and secure a work piece. The guide member prevents a work piece from translating or sliding laterally along the work surface away from the saw blade. In some embodiments, the device may further comprise one or more alignment plates for consistently orienting the device in a desired or aligned orientation relative to a fixed component of the saw, such as the guide fence or guide rail. In addition, in some embodiments, at least a portion of the lower surface of the securing member comprises friction or gripping means to enhance holding the work piece and prevent movement of a work piece relative to the device and the saw blade. Friction means include, but is not limited to, sandpaper, protrusions extending from the lower surface, knurled surfaces, adhesives, magnets, and various similar objects for gripping or engaging the work piece as will be recognized by one of ordinary skill in the art. The securing device is also provided with a positioning arm that extends away from the planer body in a direction generally away from the saw blade. A longitudinal slot is formed in the positioning arm and engages a threaded post secured to the base or frame of the saw, allowing the device to pivot about the post and be repositioned laterally along the work surface to accommodate work pieces of different shapes and sizes. Cylindrical spacers may be positioned on the threaded post, under the positioning arm to elevate the securing member relative to the work surface of the saw to accommodate work pieces of different thicknesses.

In addition, the miter saw hold down device enhances the ability to cut a work piece, including relatively small work pieces. Difficult and dangerous cuts not previously contemplated with a miter saw may be made easily and safely using this device.

An alternative embodiment of a safety device for use with a miter saw incorporates a pair of safety devices or safety arms that are positioned on opposite sides of the saw blade, although it should be understood that one safety device could be utilized at a time, in a preferred embodiment one device would be positioned on each side of the saw blade. Each device comprises a primary support arm that extends toward the saw blade. A first safety plate slideably engages the primary support arm and extends from the distal end of the primary support arm toward the alignment wall of the miter saw. The position of the first safety arm is biased such that it contacts the alignment wall to form a continuous blocking wall between the saw blade and the operator. In this manner, as the miter saw is rotated or repositioned to create cuts at different angles, the first safety plate automatically adjusts its position under the influence of the bias to remain in contact with the alignment wall. If two safety devices are used simultaneously, one on each side of the saw blade, the second safety device will similarly adjust to the repositioning of the saw blade to also remain in contact with the alignment wall. As a further option, a second safety plate may be attached to the first safety plate to further reduce or close the opening between the first safety plate and the surface of the miter saw thereby adding further protection for the operator.

In alternative embodiments, each of the foregoing described components may be provided with visual or tactile safety indicia to indicate to a user that appendages, such as the user's hand and fingers, should not extend past a predetermined point or be positioned in a location other than as indicated. Indicia for use in the present invention include, but are not limited to, protrusions, indentations, markings, grooves, stepped features, text, symbols and similar features, as well as various combinations thereof.

These and other advantages will be apparent from the disclosure of the invention(s) contained herein. The above-described embodiments, objectives, and configurations are neither complete nor exhaustive. As will be appreciated, other embodiments of the invention are possible using, alone or in combination, one or more of the features set forth above or described in detail below. Further, the summary of the invention is neither intended nor should it be construed as being representative of the full extent and scope of the present invention. The present invention is set forth in various levels of detail in the summary of the invention, as well as, in the attached drawings and the detailed description of the invention and no limitation as to the scope of the present invention is intended to either the inclusion or non-inclusion of elements, components, etc. in this summary of the invention. Additional aspects of the present invention will become more readily apparent from the detailed description, particularly when taken together with the drawings. Moreover, reference made herein to "the present invention" or aspects thereof should be understood to mean certain embodiments of the present invention and should not necessarily be construed as limiting all embodiments to a particular description.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

FIG. 7 is a perspective view of one embodiment of a right hand push device, primarily intended for use with a table saw.

FIG. 8 is a top plan view of the embodiment of FIG. 7.

FIG. 9 is a left side plan view of the embodiment of FIG. 8.

FIG. 10 is a front plan view of the embodiment of FIG. 8.

FIG. 11 is a right plan view of the embodiment of FIG. 8.

FIG. 12 is a perspective view of an embodiment of a swing arm push device of the present invention, primarily intended for use with a jointer, router, shaper and/or table saw.

FIG. 13 is a top plan view of the embodiment of FIG. 12.

FIG. 14 is a left plan view of the embodiment of FIG. 13.

FIG. 15A is a front plan view of the embodiment of FIG. 12, further showing a work piece in phantom with a push bar in a horizontal position resting on top of the work piece.

FIG. 15B is a front plan view of the embodiment of FIG. 12, further showing the swing arm disengaging the trailing edge of a work piece (shown in phantom) as the work piece moves to the left.

FIG. 15C is a front plan view of the embodiment of FIG. 12, further showing the swing arm horizontally aligned with the trailing edge of the work piece (shown in phantom) to enable pushing of the work piece through a cutting zone.

FIG. 16 is a right plan view of the embodiment of FIG. 13.

FIG. 23 is a perspective view of one embodiment of an anti-kickback device of the present invention.

FIG. 24 is a top plan view of the embodiment of FIG. 23.

FIG. 25 is a cross-sectional view taken along line 25-25 of FIG. 24.

FIG. 26 is a left plan view of the embodiment of FIG. 24.

FIG. 27 is a front plan view of the embodiment of FIG. 24.

FIG. 28 is a right plan view of the embodiment of FIG. 24.

FIG. 58 is a front elevation view of the right hand push device of FIG. 52, further illustrating the lateral adjustability of the swing arm.

FIG. 59 is a side elevation view of the right hand push device of FIG. 52, further illustrating the longitudinal adjustability of the swing arm.

FIG. 60 is a side elevation view of the right hand push device of FIG. 52, further illustrating the pivoting motion of the swing arm.

FIG. 63 is a top plan view of the right hand push device of FIG. 61.

FIG. 64 is an end elevation view of the right hand push device of FIG. 61.

FIG. 65 is a cross-section of the right hand push device of FIG. 61, taken along line 65-65 of FIG. 64.

FIG. 66 is a first side elevation view of the right hand push device of FIG. 61.

FIG. 67 is a second elevation view of the right hand push device of FIG. 61, illustrating the opposite side compared to FIG. 66.

FIG. 70 is top plan view of the right hand push device of FIG. 68.

FIG. 71 is an end elevation view of the right hand push device of FIG. 68.

FIG. 72 is cross-section of the right hand push device of FIG. 61, taken along line 72-72 of FIG. 71.

FIG. 73 is first side elevation view of the right hand push device of FIG. 68.

FIG. 74 is a second elevation view of the right hand push device of FIG. 61, illustrating the opposite side compared to FIG. 73.

FIG. 91 is a top plan view of the device of FIG. 89.

FIG. 92 is an end plan view of the device of FIG. 89.

FIG. 93 is a first side elevation view of the device of FIG. 89.

While the following disclosure describes the invention in connection with those embodiments presented, one should understand that the invention is not strictly limited to these embodiments. Furthermore, one should understand that the drawings are not necessarily to scale, and that in certain instances, the disclosure may not include details which are not necessary for an understanding of the present invention, such as conventional details of fabrication and assembly.

DETAILED DESCRIPTION

Figure 1A:
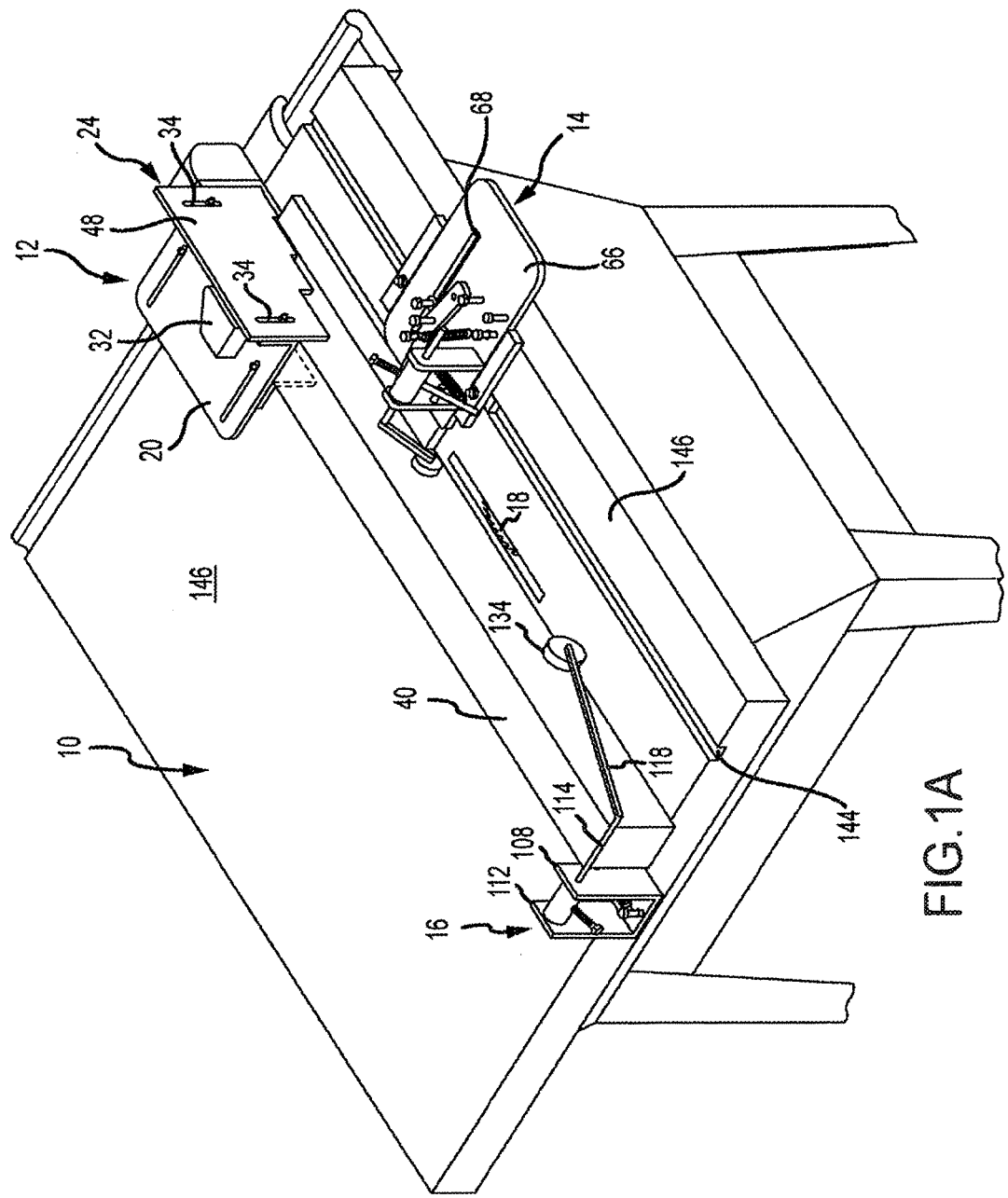
FIG. 1A is a perspective view of a table saw with exemplary embodiments of component pieces of the safety system of the present invention. A work piece is shown in a pre-cut position.
Figure 1B:
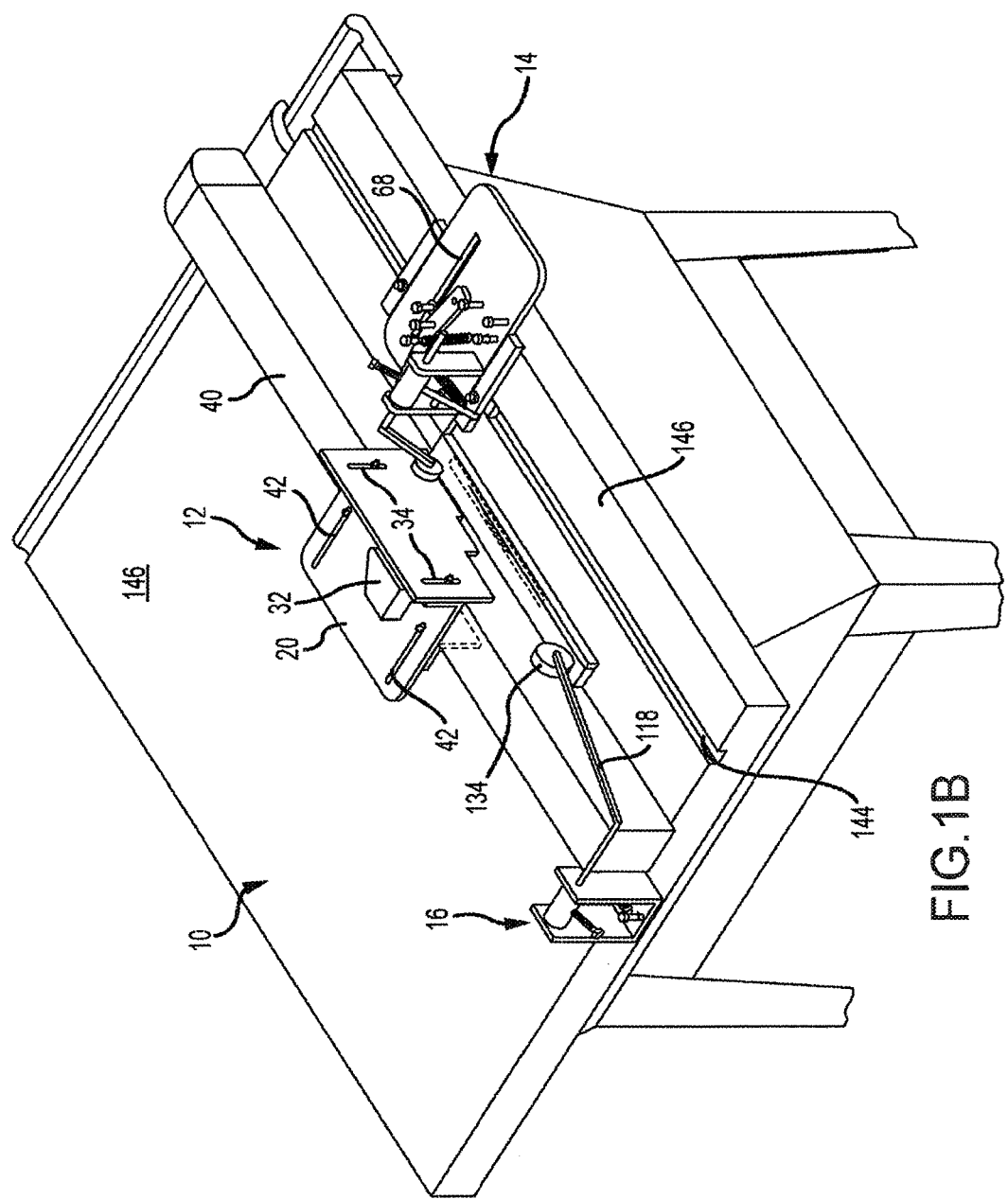
FIG. 1B is a perspective view of the exemplary embodiment shown in FIG. 1A, further showing a work piece during cutting.
Figure 1C:
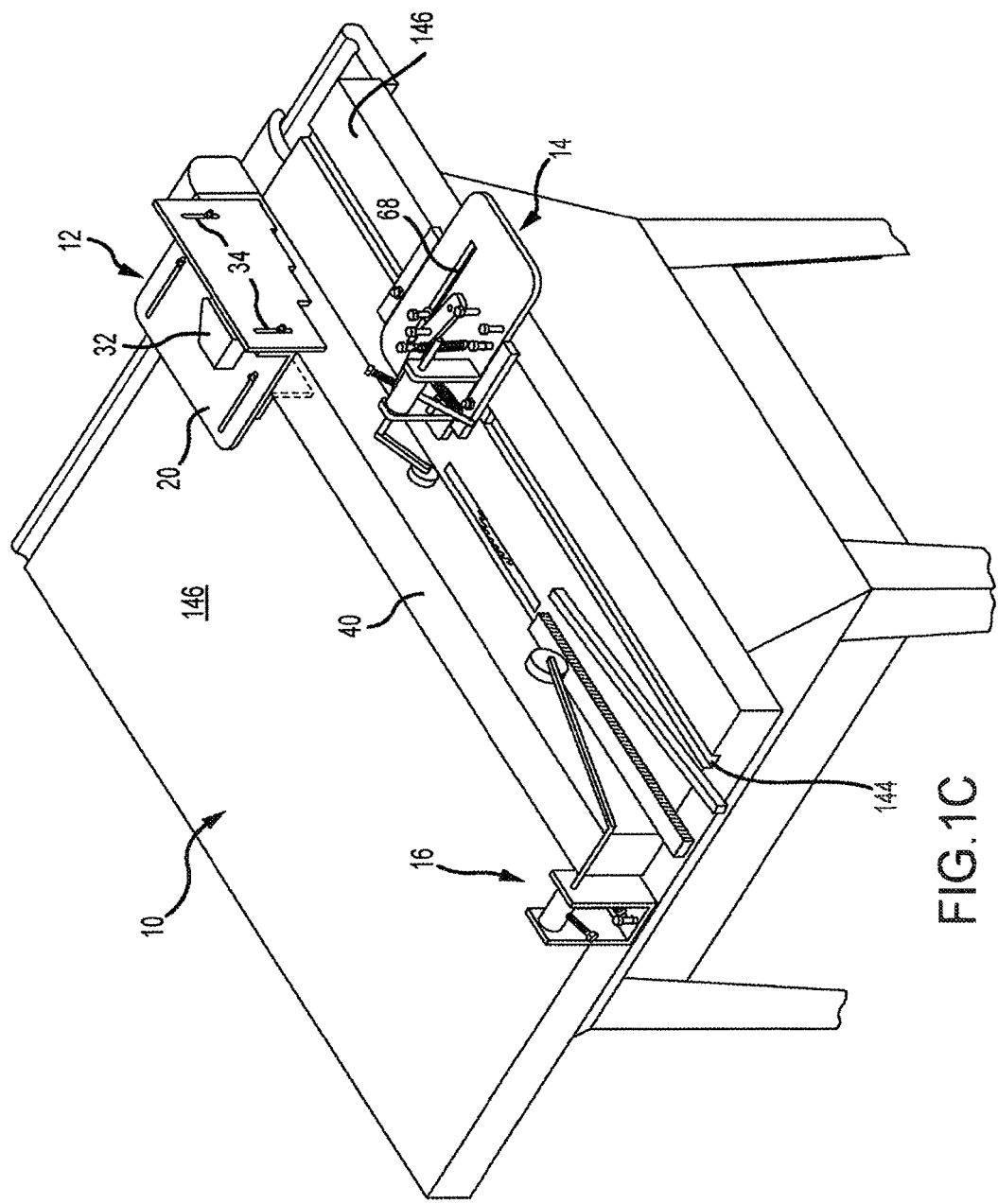
FIG. 1C is a perspective view of the exemplary embodiment shown in FIG. 1A, further showing the work piece following cutting.

Embodiments of the safety system disclosed herein include multiple separate safety devices or components that can be used individually or in combination to enhance the safety of and reduce injuries to an operator of powered cutting tools. FIGS. 1A through 1C depict a table saw 10 with exemplary embodiments of three component devices of the overall system of the present invention. These component pieces are a right hand push device 12, a dual bearing hold down device 14, and an anti-kickback device 16. However, while the dual bearing hold down device 14 is typically positioned in front of the cutting blade 18 and the anti-kickback device 16 is typically positioned following the cutting blade 18, they are not restricted to those physical locations and may be positioned adjacent or in close proximity to the cutting blade, on opposite sides of the cutting blade or at other locations selected by those of skill in the art for purposes of enhancing safety and/or facilitating use of the devices. Accordingly, the names of these components should not be viewed as limitations on the functionality of these component pieces, but are simply labels for purposes of distinguishing one component piece from the other.

One embodiment of a right hand push device 12 will now be described in greater detail. Referring to FIGS. 7-11, the right hand push device 12 is a component piece designed to protect the right hand of an operator of a table saw, planer/jointer, router or other cutting equipment. FIGS. 7-11 illustrate use with a table saw 10. The right hand push device 12 comprises a horizontal plate 20 with an upstanding wall portion 22 that abuts a vertically adjustable safety wall 24. It further comprises a horizontally adjustable guide wall 26 with a horizontal portion 28 that abuts the lower surface 30 of the horizontal plate 20, and a handle 32. Vertical slots 34 are formed in the vertically adjustable safety wall 24 to receive threaded bolts 36 that extend from and are affixed to the vertically upstanding wall portion 22 of the horizontal plate 20. Nuts 38 or other securing members are affixed to the exposed end of the bolts 36 to secure the vertical adjustable safety wall 24 in a fixed position relative to the vertically upstanding wall portion 22 of the horizontal plate 20.

It should be appreciated that other ways of adjustably securing the safety wall to the horizontal plate will occur to those of skill in the art upon reading this disclosure and such methods are deemed to be within the scope of the present invention.

As is illustrated, the right hand push device 12 straddles the guide or rip fence 40 of the table saw 10 or any other cutting equipment. The straddled fit provides balance to the right hand push device. Preferably, the handle 32 is positioned on the horizontal plate 20 to be directly on top of the rip fence 40. This allows a wide variety of pressure to be applied by the operator without dislodging the right hand guide 12 from the rip fence. Slots 42 also are formed in the horizontal plate 20 to allow adjustable positioning of the guide wall 26 relative to the safety wall 24 to accommodate rip fences of different widths. Threaded bolts 44 or other securement means known to those of skill in the art extend from the horizontal portion 28 of the guide wall 26 through the slots 42 formed in the horizontal plate 20. Nuts 46 are tightened to secure the position of the guide wall 26 relative to the safety wall 24. As can be seen in FIGS. 1A and 1B, by the operator placing his or her right hand on the handle 32 and advancing the right hand push device 12 along the rip fence 40 through the cutting zone of the table saw 10, the operator's right hand is located away from the cutting zone and, should the work piece kick or jump, the upper portion 48 of the safety wall 24 blocks the operator's hand from accidentally contacting the cutting blade 18. When not in use, the right hand push device 12 may mount on a post extending from the rip fence 40.

In addition, the lower edge 50 of the safety wall 24 comprises a series of stepped cut outs 52 designed to accommodate work pieces of different thickness. Each cut out comprises a horizontal surface 52h and a vertical surface 52v. Depending upon the thickness of a work piece being cut, the appropriate cut out 52 is positioned such that the horizontal surface 52h rests on the top surface of the work piece to prevent vertical movement of the work piece during the cutting operation and the vertical surface 52v engages the trailing edge of the work piece to allow the operator to advance the work piece through the cutting zone by advancing the right hand push device 12 along the guide rail or rip fence 40 using the handle 32. It is preferred that the horizontal surfaces 52h have sufficient length to keep the work piece pushed down against the surface of the table throughout the entire cut.

In a preferred embodiment, the safety wall 24 has a width of no more than approximately 0.25-0.0375 inches to permit thin cuts while still fitting between the blade and rip fence. Making the device of aluminum, or other lightweight yet strong metal, allows the right hand push device to have a relatively thin width.

Figure 2:
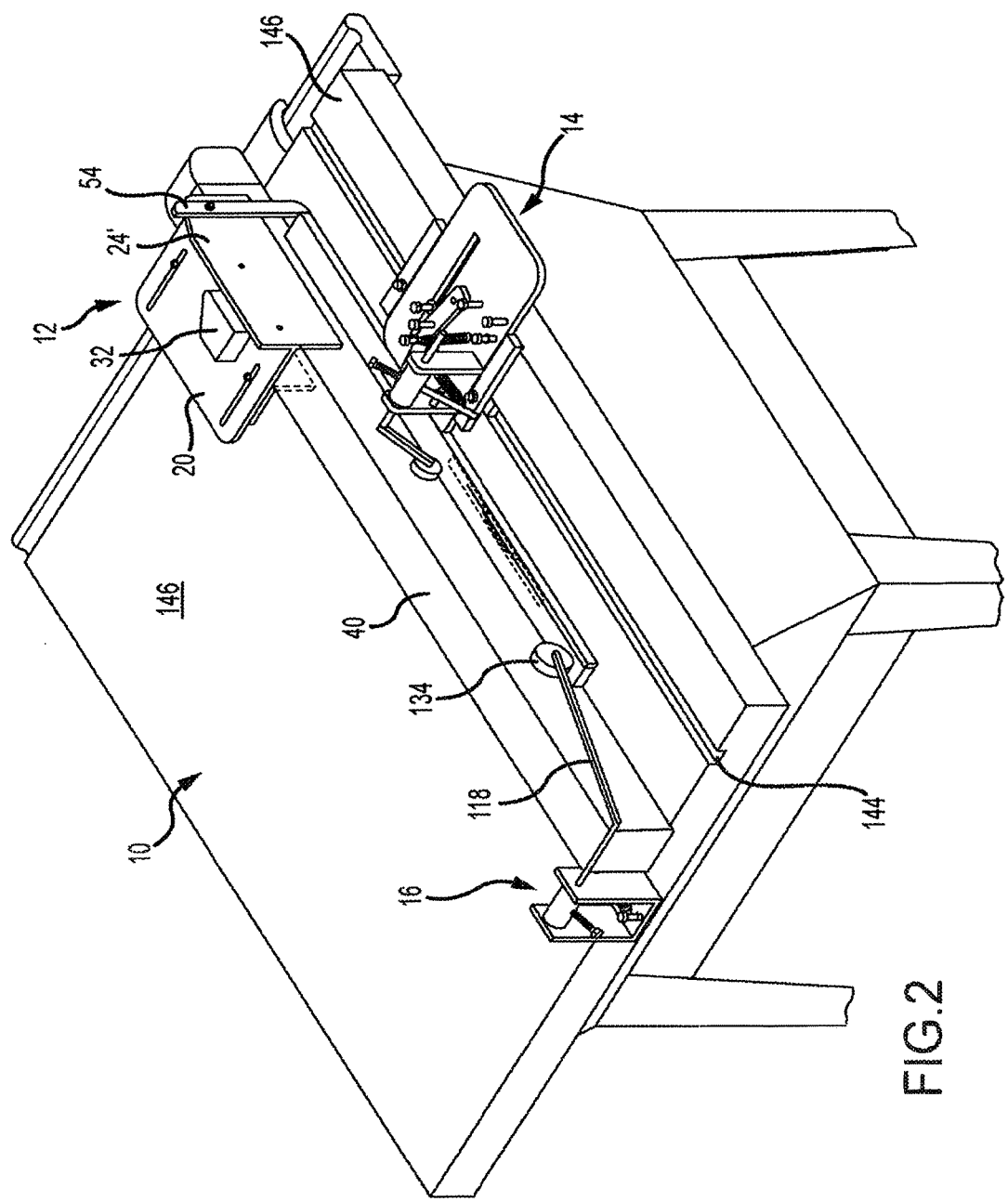
FIG. 2 is a perspective view of an alternative embodiment of an exemplary safety system of the present invention.

An alternative embodiment of the right hand push device 12 is shown in FIGS. 12-16. In this embodiment, the horizontal plate 20 and the horizontally adjustable guide wall 26 are identical to that of the prior embodiment. However, the vertically adjustable safety wall 24 is replaced with a safety wall 24' that is fixed in position relative to the horizontal plate 20. Instead of a series of stepped cut outs, this embodiment includes a rotatable swing arm pusher 54 that is secured to the safety wall 24' at a pivot point 56. As shown in the sequence of FIGS. 15A-15C, the swing arm pusher 54 is designed to rotate 90 degrees from a horizontal position, where it rests upon the top surface of a work piece, through a vertical position shown in FIG. 15C, where it engages the trailing edge of a work piece. The bottom surface 58 of the swing arm pusher is rounded such that as the trailing edge of the work piece passes the bottom surface of the swing arm pusher 54, the swing arm pusher rotates to the position shown in FIG. 15C. Further advancement of the work piece through the cutting zone is accomplished by the operator advancing the work piece using the right hand push device 12. A stop pin 60 is positioned at the top of the swing arm pusher 54 to engage the top surface 62 of the safety wall 24' and prevent the swing arm pusher 54 from rotating past the vertical position shown in FIG. 15C. To accommodate work pieces of different thicknesses, the safety wall 24' may include a plurality of apertures 64 generally vertically aligned to adjust the vertical position of the swing arm pusher 54 by relocating the pivot point to a different aperture. FIG. 2 illustrates a table saw 10 with this embodiment of the right hand push device 12 positioned on the rip fence 40. The upper portion 48 of the safety wall 24' protects the operator's hand during cutting.

A further alternative embodiment of the right hand push device 12 to that shown in FIGS. 12-16 is the swing arm push device 12 shown in FIGS. 52-60. The right hand push device 12 comprises a horizontal plate 20 with an upstanding wall portion 22 that abuts a vertically adjustable safety wall 24'. It further comprises a laterally adjustable horizontal guide wall 26. The guide wall 26 is repositionable relative to the horizontal plate 20 by means of screws 44 that engage the guide wall through slots 42 formed in the horizontal plate 20. The guide wall 26, horizontal plate 20 and the lower portion of the safety wall 24' form a channel that saddles a guide or rip fence, for example, on a table saw. The channel may be widened or narrowed to accommodate fences of different sizes by changing the position of the guide wall 26 relative to the lower portion of the safety wall 24'. A knob 32 affixed to the horizontal plate 20 is grasped by the operator to push the device 12 along the guide fence.

Like the embodiment of FIGS. 12-16, this embodiment includes a swing arm pusher 54', but unlike the embodiment of FIGS. 12-16, the swing arm pusher 54' is longitudinally and laterally adjustable to accommodate work pieces of varying shapes and sizes. A post 250 extends laterally away from the safety wall 24'. A first bracket 252, with an aperture 254 formed therein, receives the post 250 within the aperture 254. A manually tightenable screw 256 secures the position of the first bracket 252 relative to the post 250. As shown in FIG. 58, the swing arm 54' may be repositioned along the post 250 by adjusting the position of the first bracket 252. A first arm 258 is pivotally connected to the first bracket 252 at pivot 260. The pivot connection allows the arm 258 to pivot in a manner similar to the swing arm 54 in the embodiment of FIGS. 12-16. A second bracket 262 is affixed to the arm 258. The second bracket 262 comprises a longitudinal channel 264 of generally the same cross-sectional shape as the first arm pusher 258. An elongate longitudinal slot 266 formed in the second bracket 262 allows the position of the second bracket 262 to be adjusted relative to the arm 258. The position of the second bracket 262 relative to the first arm 258 is secured by a screw 268 positioned in the slot 266. Thus, as shown in FIG. 59, the second bracket 262 may be adjusted relative to the first arm 258. In addition, in one embodiment, the end 270 of the first arm 258 may extend below the second bracket 262. In the unintended event that the cutting blade contacts the end 270 of the first arm 258, it may be desirable construct the first arm 258 of a soft material, such as a plastic or wood, rather than metal, to minimize potential damage to the cutting blade. Alternatively, in a second embodiment, the end 270 may comprise a second arm 272 (shown in FIG. 56) also attached to the channel 264 of the second bracket 262 by a second screw (not shown). The first arm 258 may be constructed of metal, while the second arm 270 is constructed of a softer material and may be replaced at a less cost if damaged.

Figure 53:
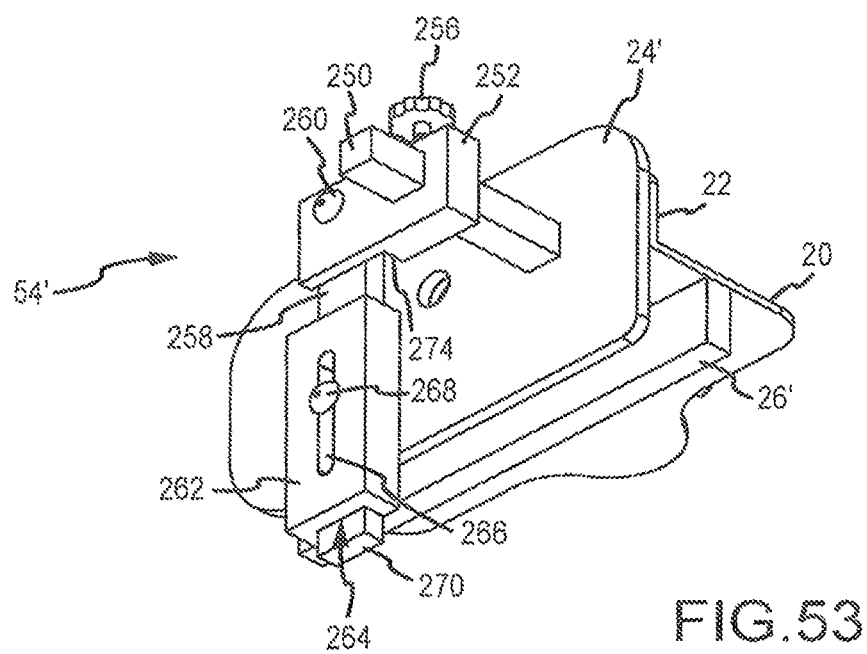
FIG. 53 is a lower perspective view of the right hand push of FIG. 52.
Figure 54:
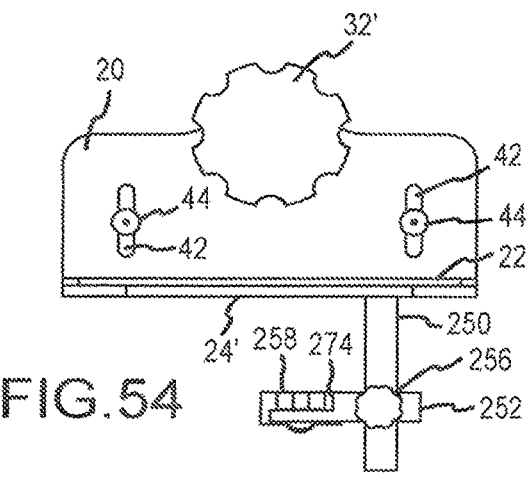
FIG. 54 is a top plan view of the right hand push device of FIG. 52.
Figure 55:
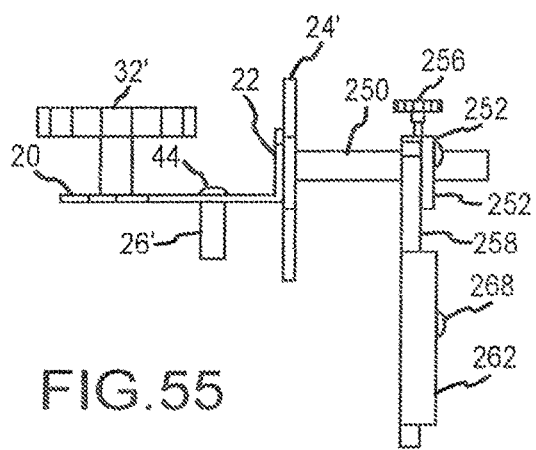
FIG. 55 is a front elevation view of the right hand push device of FIG. 52.
Figure 56:
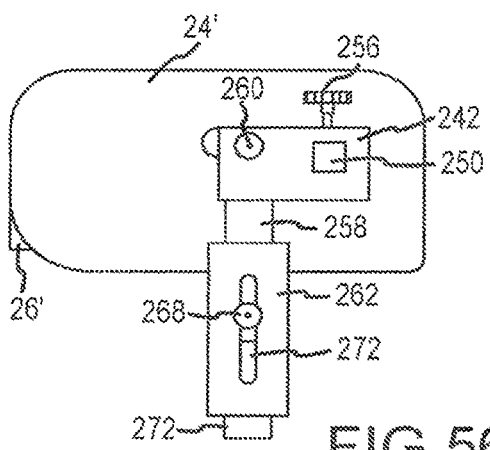
FIG. 56 is a side elevation view of the right hand push device of FIG. 52.
Figure 57:
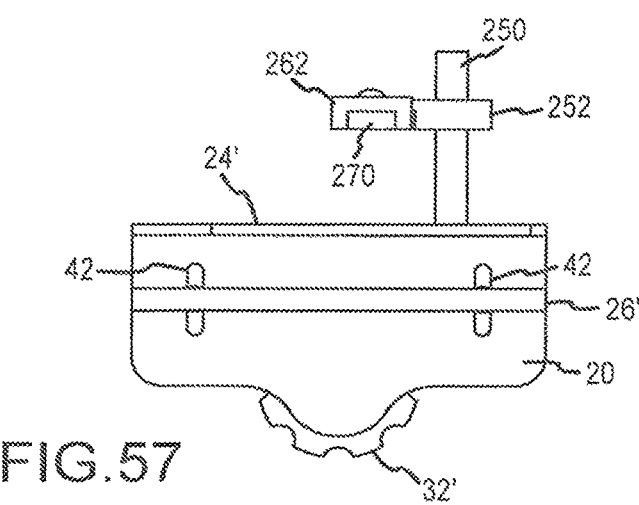
FIG. 57 is a bottom plan view of the right hand push device of FIG. 52.
Figure 61:
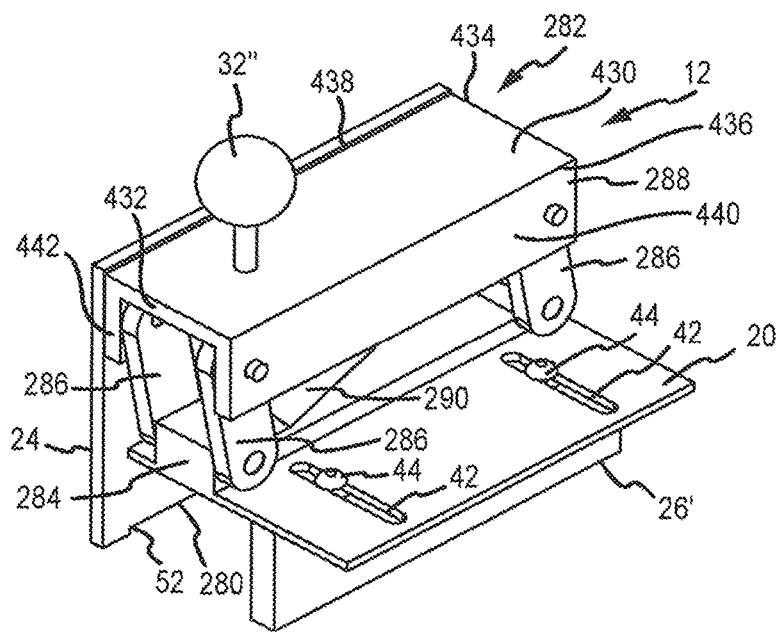
FIG. 61 is a perspective view of an alternative embodiment of a right hand push device.
Figure 62:
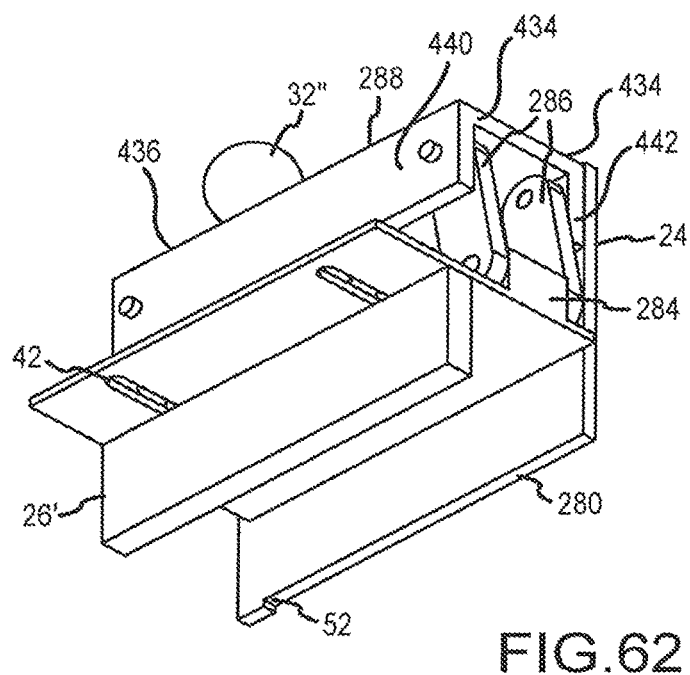
FIG. 62 is a lower perspective view of the right hand push device of FIG. 61.
Figure 68:
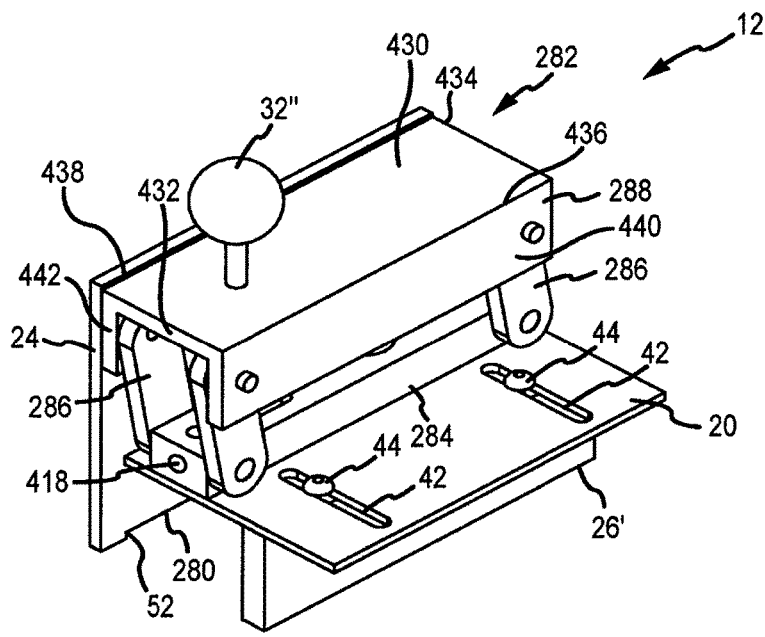
FIG. 68 is perspective view of an alternative embodiment of a right hand push device.
Figure 69:
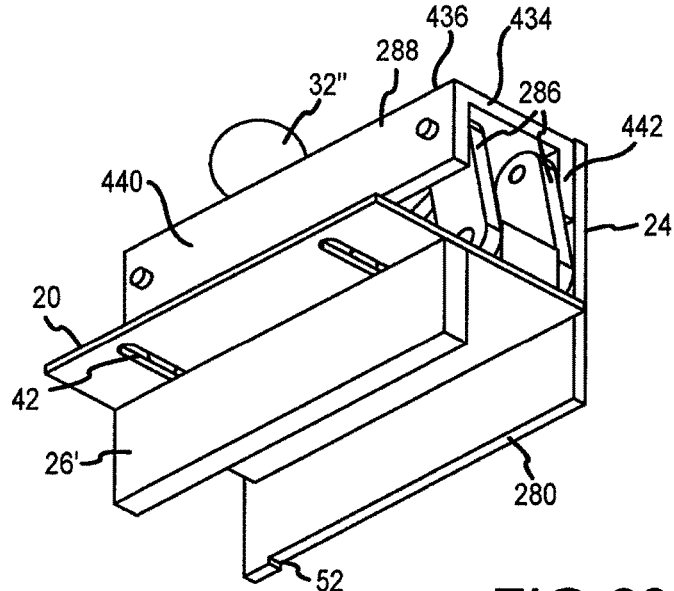
FIG. 69 is lower perspective view of the right hand push device of FIG. 68.
Figure 75:
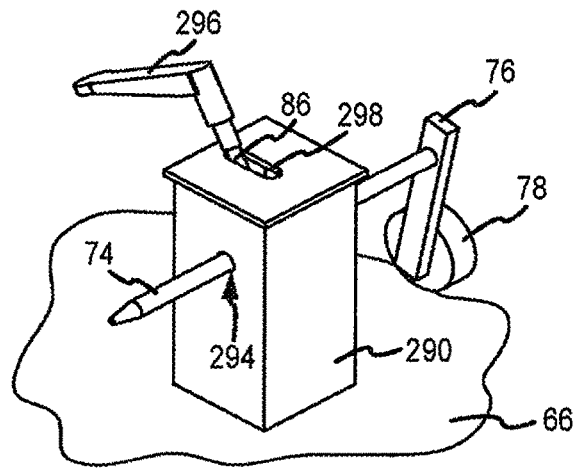
FIG. 75 is a perspective view of an alternative embodiment of a bearing member shown in a first position attached to a base plate.
Figure 76:
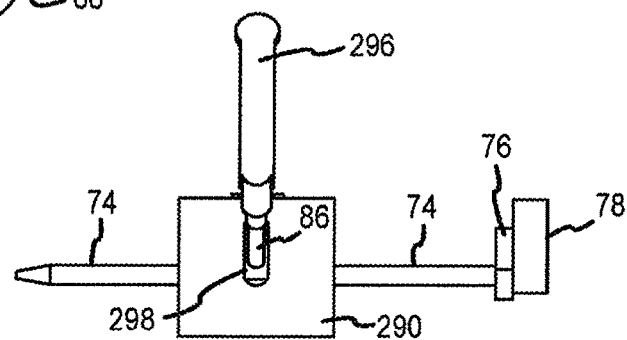
FIG. 76 is a top plan view of the bearing member of FIG. 75.
Figure 77:
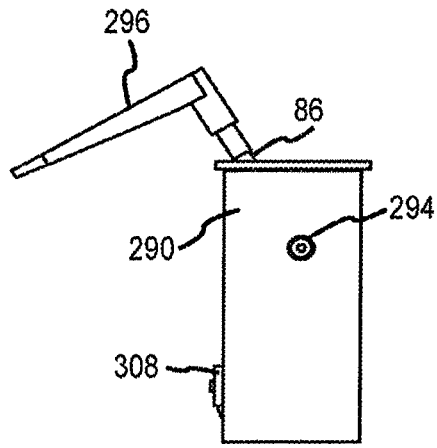
FIG. 77 is a first side plan view of the bearing member of FIG. 75.
Figure 78:
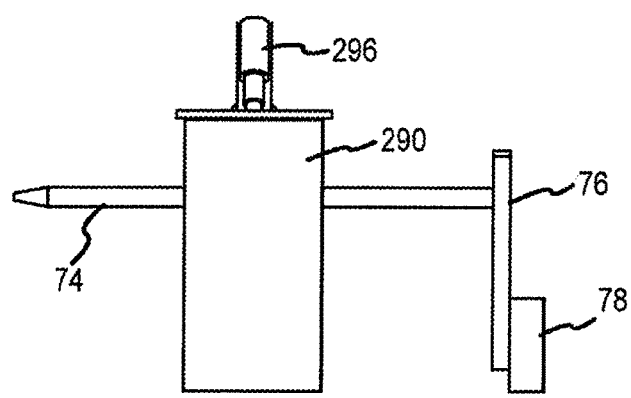
FIG. 78 is a front plan view of the bearing member of FIG. 75.
Figure 79:
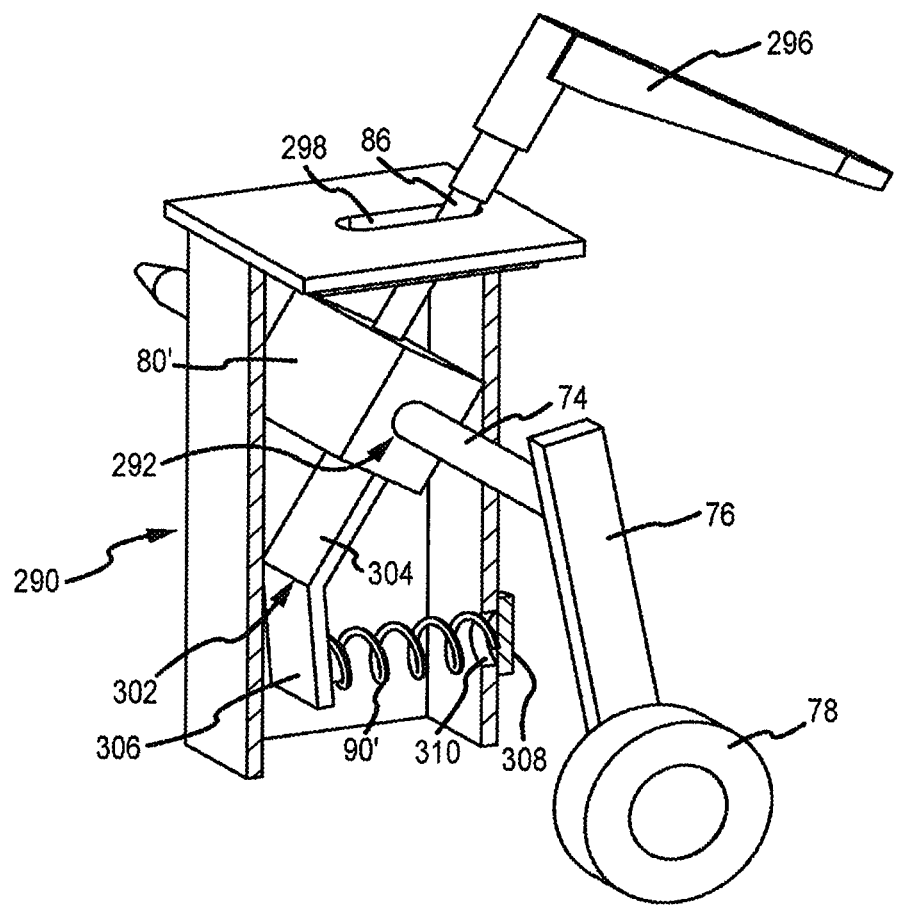
FIG. 79 is a partial cross sectional view of the bearing member of FIG. 75.

As illustrated in FIG. 60, the swing arm 54' is designed to pivot clockwise around pivot point 260. With the device 12 positioned on a guide fence, a work piece may be moved beneath the swing arm 54' and the arm 54' will rotate out of the way and allow the work piece to move past. Once the work piece is past the swing arm 54', the arm 54' will be in a substantially vertical position. As shown in FIG. 53, the first bracket 250 comprises a shoulder 274 that prevents counterclockwise rotation of the swing arm 54' which, in turn, secures the position of the swing arm 54' to engage and push a work piece forward through a cutting zone of a cutting instrument.

Yet another embodiment of a work piece pushing element 12 is shown in FIGS. 61-67. Like the prior embodiments, this device 12 includes a horizontal plate 20, an adjustable guide wall 26 and a safety wall 24. The base 280 of the safety wall 24 includes a notched edge 52 to assist in engaging a work piece. Unlike the earlier embodiments, in this embodiment the safety wall 24 is attached to a spring biased handle portion 282. A mounting block 284 is affixed to the upper surface of the horizontal plate 20. Four links 286 are pivotally connected to the mounting block 284. The opposite ends of the four links 286 are pivotally connected to a saddle bracket 288. It should be appreciated that four links are not required to position the handle portion 282 relative to the horizontal plate 20. Fewer or more links may be used or other connections known to those of skill in the art upon review of this disclosure are within the scope of the present invention. A biasing member 290, such as a leaf spring, is positioned between the saddle bracket 288 and the upper surface of the horizontal plate 20 to bias the saddle bracket 288 away from the horizontal plate 20 and, simultaneously, raise the position of the notched edge 52 of the safety wall 24 away from a work surface of the cutting instrument. As a result, the notch 52 and base 280 are spaced or elevated above the surface of the table saw and out of the way of additional work pieces. In other words, a work piece will slide along the surface of the table saw, against the guide fence and underneath the notch 52 and base 280. The pushing element 12 need not be removed from the guide fence as each successive work piece is placed on the table saw for cutting. Also, as illustrated in FIG. 67, the vertical position of the safety wall relative to the handle portion 282 may be adjusted by loosening the nuts 38 on the threaded bolts 36 and nuts 38 to accommodate thinner or thicker work pieces. Like the other embodiments, the guide wall 26 is laterally adjustable relative to the lower portion of the safety wall 24 to form a channel of varying widths to accommodate a variety of guide fence shapes. When it is time to engage a work piece, the operator pushes down on the knob 32 attached to the saddle bracket 288 and against the action of the biasing member 290. This action brings the notched edge 52 of the safety wall 24 and the base 280 into engagement with the trailing edge of a work piece. As a result, the pusher device 12 may advance the work piece through a cutting zone with the safety wall 24 protecting the hand of the operator and the lower edge 52 engaging the work piece to advance the work piece through the cutting zone. The length of the base 280 further serves to hold down the work piece. It should be appreciated that different safety walls may be incorporated into this structure to provide a longer or shorter base 280 and/or a deeper notch 52.

Another embodiment of a work piece pushing element 12 is shown in FIGS. 68-74. This embodiment is similar to that illustrated in FIGS. 61-67, with the general exception that the biasing member 290, which is a leaf spring in the embodiment of FIGS. 61-67, is a deflection plate 400 and compression spring 402 in the embodiment of FIGS. 68-74. Otherwise, the components of the pushing element 12 are similar. With reference to FIGS. 72 and 73, the mounting block 284 includes a first cut out 404 and a second cut out 406. A first end of a compression spring 402 is positioned in the second cut out 406. A first end of a deflection plate 400 is pivotally connected to the mounting block 284 in the first cut out 404. More specifically, the deflection plate 400 comprises a main body 408 with a downwardly depending post 410 and a downwardly depending flange 412 positioned at the leading edge of the deflection plate. The opposite end of the spring 402 is held in position relative to the bottom of the deflection plate 400 by the post 410. A pivot pin 414 extends through the flange 412 and the mounting block 284 to secure the deflection plate 400 relative to the mounting block 284 and the lower surface 416 of the saddle bracket 288. The compression spring 402 maintains the position of the deflection plate 400 against the lower surface of the saddle bracket 288 such that the notch 52 and base 280 are elevated above the surface of the table saw and out of the way of work pieces. The amount of vertical separation between the notch 52 and table saw work surface is adjustable in two ways. As noted above, the relative position of the safety wall 24 may be adjusted by loosening nuts 38 on threaded bolds 36, repositioning the safety wall 24 and retightening the nuts 38. Alternatively or in addition, the range of motion of the deflection plate may be adjusted. As seen in FIGS. 68-72, a threaded bore 418 is formed in the leading edge of the mounting block 284 and a set screw 420 is positioned in the bore to block the rotation of the flange 412 about pivot 414. In turn, this sets the distance or height the notch 52 and base 280 are spaced from the surface of the table saw. In operation, a work piece is positioned on the surface of the table saw, against the guide fence and underneath the base 280 of the pusher 12. The operator grasps the knob 32 and presses downwardly until the step 52 engages the trailing edge of a work piece. The four links 286 pivot in unison and the spring 402 compresses until the work piece is engaged. Upon completion of the cutting operation, the operator returns the pushing element 12 to the proximal end of the guide fence for initiating a subsequent cut. Upon release of the handle, the spring 402 elevates the deflection plate 400 and, in turn, the saddle bracket and handle 32 such that the base 280 and notch 52 are spaced above the surface of the table saw. In a preferred embodiment, the height or space between the surface and the notch may be adjusted between approximately 1 to 2 inches and more preferably between 1.25 and 1.75 inches. As those of skill in the art will appreciate upon review of this disclosure, the length of the base 280 may also be increased to provide enhances stability of the work piece by engagement of the work piece over a longer distance. Preferably, the length of base 280 varies between 4 and 7.5 inches.

One embodiment of the dual bearing hold down device 14 is shown in FIGS. 17-21. As shown, the dual bearing hold down device 14 comprises a base plate 66, including a slot 68 for adjusting its position relative to a mounting plate 70 secured to the cutting equipment. (See, FIGS. 29A-33B.) A pair of upstanding posts 72A, 72B are positioned to one side of the base plate 66. A rotatable shaft 74 extends through the outer post 72A and inner post 72B. A bearing arm 76 is affixed to extends perpendicularly from one end of the shaft 74. A guide roller or vertical bearing 78 is positioned at the distal end of the bearing arm 76. A collar or sleeve 80 is positioned around the portion of the shaft 74 between the outer post 72A and outer post 72B. A pair of bores 82, 84 are formed in the collar 80. The first bore 82 receives a lock bolt 86 to lock the position of the collar 80 relative to the shaft 74. The second bore 84 receives a limit/tension arm 88. One end of a tension spring 90 is affixed to the distal end of the limit/tension arm 88 and the opposite end of the spring 90 is attached to a post 92 or other upstanding member affixed to the base plate 66. The tension spring 90 rotates the collar 90 and shaft 74 as one piece, provided the lock bolt 86 engages both pieces. A limit/tension arm stop 94 extends from one of the posts 72 to restrict or limit rotation of the collar 90 and shaft 74.

Figure 19:
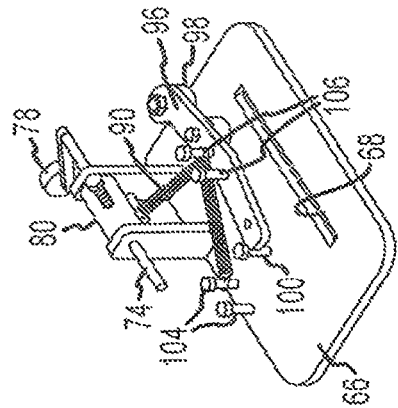
FIG. 19 is a left plan view of the embodiment of FIG. 17, further showing a work piece in phantom.
Figure 20:
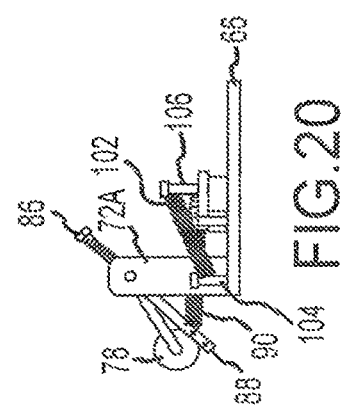
FIG. 20 is a front plan view of the embodiment of FIG. 18.
Figure 21:
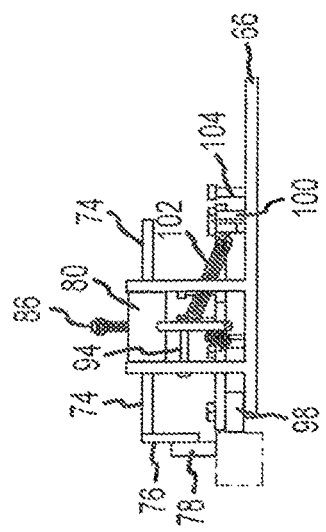
FIG. 21 is a right plan view of the embodiment of FIG. 18, further showing a work piece in phantom.

The dual bearing hold down device 14 further comprises a pivot arm 96 which pivots about a pivot point P affixed to the base plate 66. One end of the pivot arm 96a includes a horizontal hold down roller or horizontal bearing 98 that abuts a side surface of a work piece and holds the work piece against a guide rail 40. A stop 100 is affixed to and extends upwardly from the base plate 66 to restrict rotational movement of the pivot arm 96. A second tension spring 102 extends between a post 104 secured to the base plate 66 and a post 106 secured to the opposite end of the pivot arm 96b. The two tension springs force the hold down rollers to engage and apply pressure against surfaces of the work piece to hold the work piece during cutting. Additional posts 104, 106 on the base plate 66 and on the second end of the pivot arm 96b are provided to allow repositioning of the spring 102 to adjust the tension applied to the pivot arm 96 and shaft 74. FIGS. 19 and 21 illustrate engagement of a work piece or work piece by the vertical hold down bearing 78 and horizontal hold down bearing 98. As shown, the pivot P is positioned forward of the bearing 98 and 98' such that the bearings apply a force against the work piece at an acute angle relative to the surface of the work piece. One of skill in the art will appreciate that the posts 104 and 106 may be located at other positions to accomplish the same results, and will also appreciate that other known tensioning mechanisms may be substituted for the springs 90 and 102.

Figure 22A:
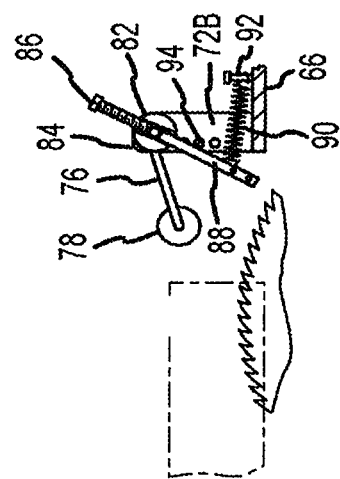
FIG. 22A is a cross-sectional view taken along line 22A-22A of FIG. 18 and further showing one embodiment of a vertical hold down roller positioned on the top surface of a work piece being cut.
Figure 22B:
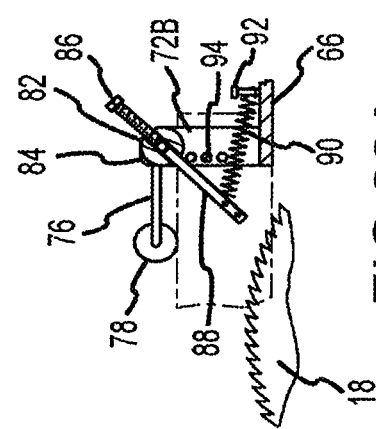
FIG. 22B is a cross-sectional view taken along line 22A-22A of FIG. 18, further showing the position of one embodiment of a vertical hold down roller following disengagement of a work piece being cut.
Figure 29A:
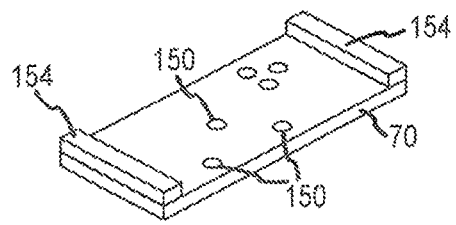
FIG. 29A is a perspective view of one embodiment of a mounting plate of the present invention.
Figure 29B:
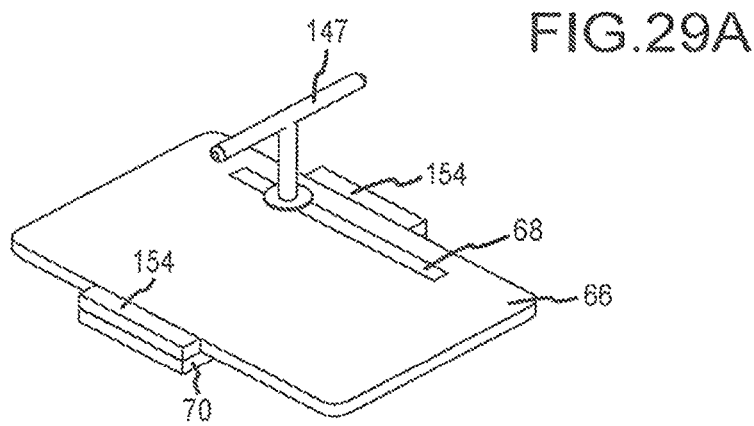
FIG. 29B is a perspective view of the embodiment of FIG. 29A, further showing one embodiment of a base plate of a dual bearing hold down device secured thereto by a lock down bolt.
Figure 30A:
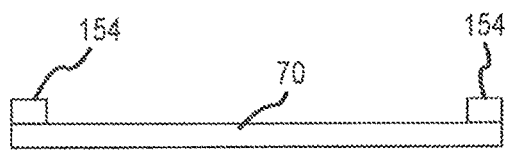
FIG. 30A is a front plan view of the embodiment of FIG. 29A.
Figure 30B:
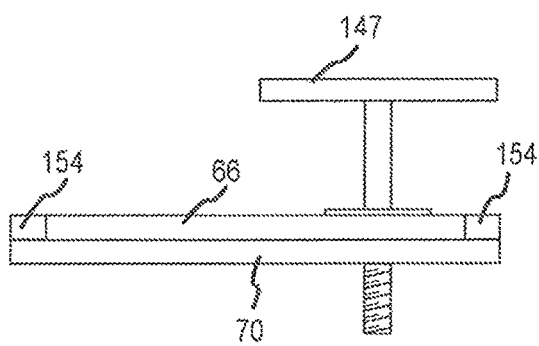
FIG. 30B is a front plan view of the embodiment of FIG. 29B.
Figure 31:
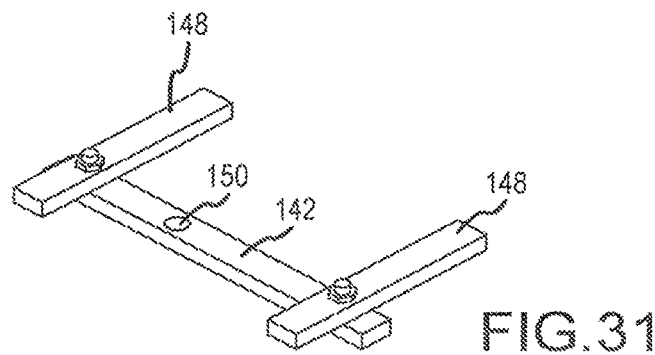
FIG. 31 is a perspective view of an alternative embodiment of a mounting plate of the present invention.
Figures 32A, 32B:
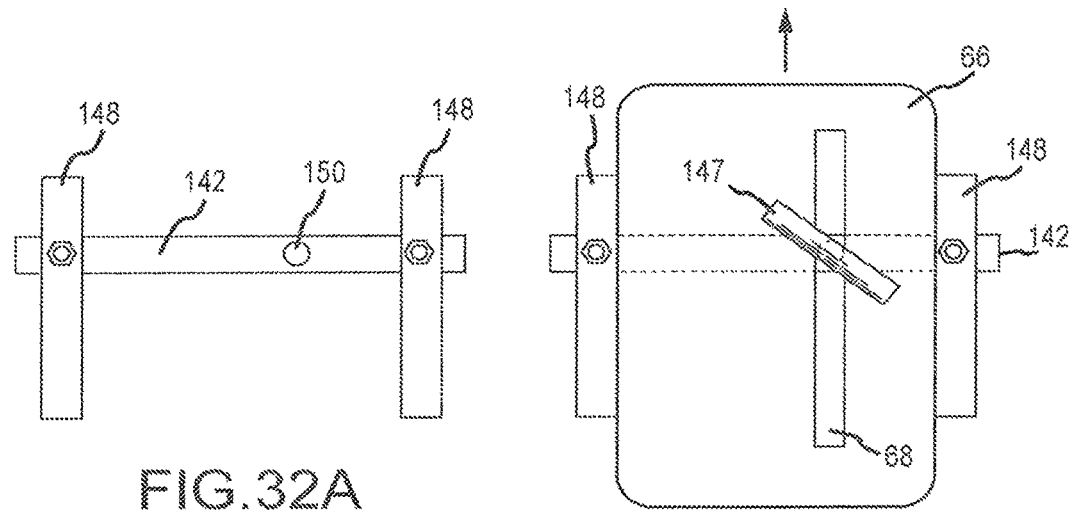
FIG. 32A is a top plan view of the embodiment of FIG. 31.
FIG. 32B is a top plan view of the guide plate of FIG. 32A, further showing one embodiment of a base plate of a dual bearing hold down device secured thereto by a lock down bolt.

The function of the limit/tension arm stop 92 and the pivot arm stop 100 is to prevent the vertical hold down bearing 78 and/or horizontal hold down bearing 98 from contacting the blade or cutting tool, once the desired cut is completed. A principle is illustrated in FIG. 22A in association with making a dado cut. As shown, the vertical hold down bearing 78 engages the top of a work piece as the work piece is being cut by a saw blade. For a dado cut, the bearing 78 may sit directly above the blade 18. The limit/tension arm 76 is being pulled counterclockwise by the spring 90 to apply downward force on the upper surface of the work piece by the vertical hold down bearing 78. This prevents the work piece from kicking or jumping. As shown in FIG. 22B, when the tail end of the work piece moves past the vertical hold down bearing 78, the force applied by the tension spring 90 acts to move the limit/tension arm 76, collar, shaft and vertical hold down arm counterclockwise towards the cutting blade. However, the limit/tension arm stop 94 limits the rotation of this assembly and prevents the vertical hold down bearing 78 from coming in contact with the blade 18. The limit stop 94 may be adjusted either by repositioning it in different apertures formed in the inner post 72B or alternatively, by adjusting the position of the collar 80 relative to the shaft 74 using the lock bolt. Alternatively, the dual bearing hold down device 14 may be positioned such that the vertical bearing 78 is not positioned over the blade or, a shaft 74 with a longer length bearing arm 76 may be substituted. A longer bearing arm 76 will position the bearing roller away from the saw blade.

Figure 18:
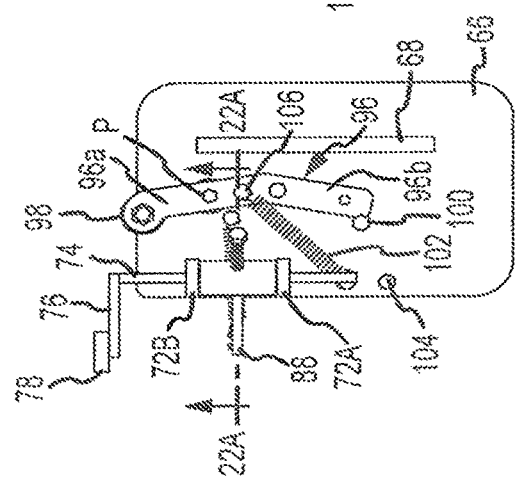
FIG. 18 is a top plan view of the embodiment of FIG. 17.
Figure 18A:
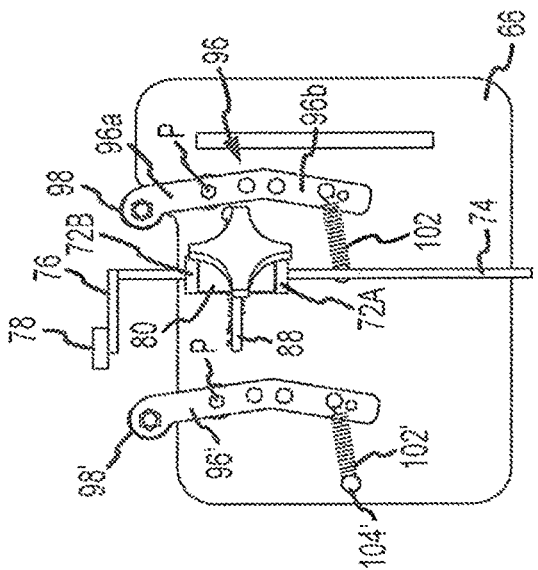
FIG. 18A is a top plan view of an alternative embodiment of the embodiment of FIG. 18

A triple bearing hold down device is shown in FIG. 18A. It is nearing identical to the dual bearing hold down device shown in FIG. 18, except that a second horizontal pivot arm 96' is affixed to the base plate 66. A horizontal hold down bearing 98' is affixed to the distal end of the second horizontal pivot arm 96' to engage a work piece in the same manner as the first horizontal pivot arm 96. An adjustable spring 102' interconnected between post 104' and the second horizontal arm 96' applies a biasing force to the second horizontal arm 96'. However, in a preferred embodiment, it is intended that the cutting instrument be positioned between the two horizontal hold down bearings 98 and 98'. In this way, the work piece is pushed against a rip fence or guide before and following the cutting of the work piece providing enhanced stability of the work piece and improved operator safety. It should be further appreciated that the relative position of the first and second horizontal arms 96 and 96' may be changed to meet particular needs, including but not limited to particular configurations of cutting tools made by various third party manufacturers. It should be further appreciated that additional horizontal arms, as well as vertical hold down arms, may be added as needed. The triple bearing hold down device is preferably suited for use with a router, jointer or table saw used for dado cuts. Also, the shaft 74 is elongated in length compared to that shown in FIG. 18 to allow the vertical bearing 78 to be moved away from the base plate 66 to accommodate wider work pieces.

Figure 3:
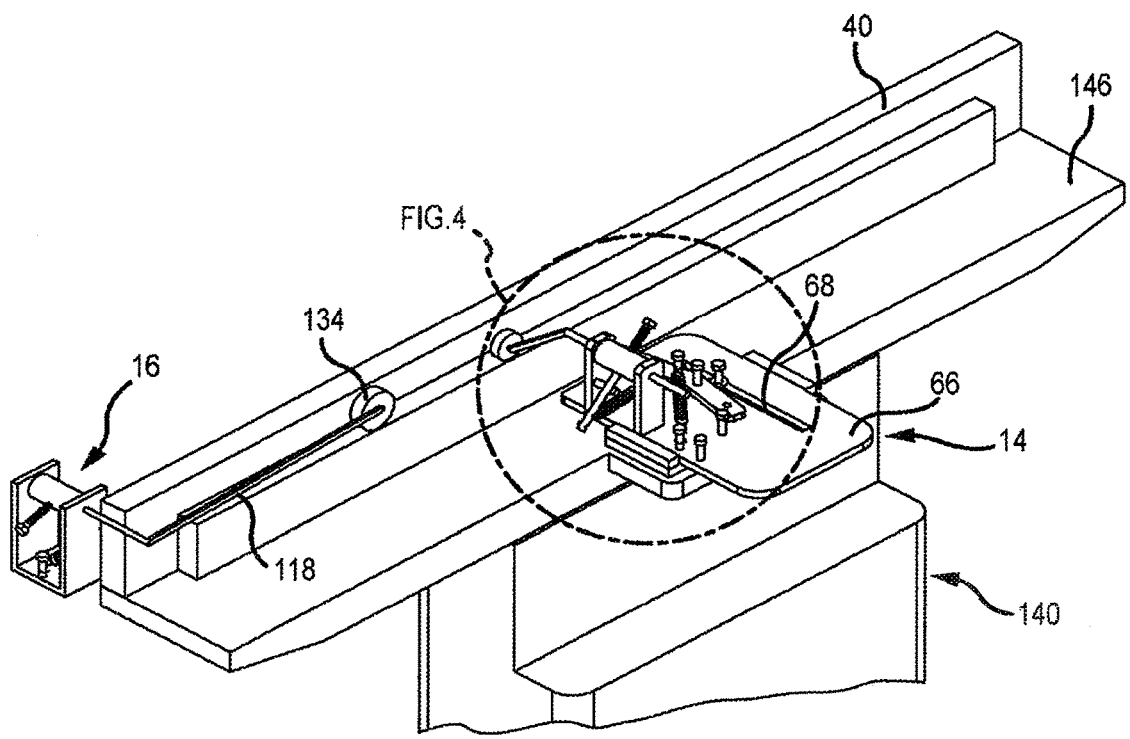
FIG. 3 is a perspective view of a jointer with the exemplary embodiments of components pieces of the safety system of the present invention.
Figure 4:
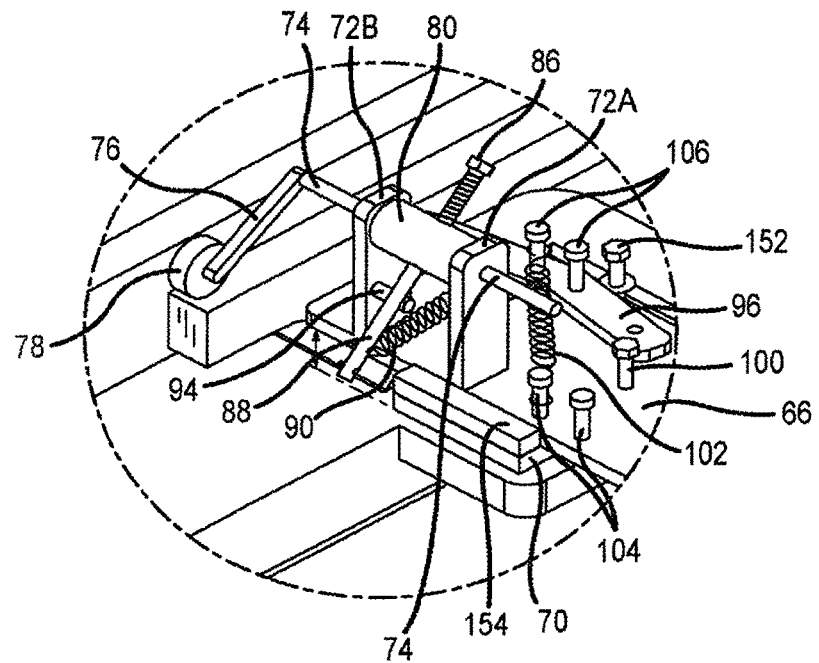
FIG. 4 is an exploded view of an exemplary embodiment of a dual bearing hold down device shown in FIG. 3.

One embodiment of an anti-kickback device 16 is shown in FIGS. 23-28. It operates in a similar fashion to the dual bearing hold down device 14. As shown in FIGS. 1A-1C and 2, the anti-kickback device 16 is secured to or near the distal end of the rip fence or guide rail 40 of a table saw, planer (FIG. 3) or similar cutting tool. The anti-kickback device 16 comprises an inner post 108 with apertures 110 to allow the inner post 108 to be secured to the rip fence 40 using sheet metal screws or similar attachment members. An outer post 112 is disposed at a position spaced from and parallel to the inner post 108. A shaft 114 extends through apertures 116 in both the inner and outer post 108, 112. An arm 118 extends perpendicularly from one end of the shaft 114 and a vertical hold down roller 134 is positioned at the opposite end of the arm 118. A collar 120 surrounds that portion of the shaft that is positioned between the two posts 108, 112. The collar 120 includes a first aperture 122 to receive a lock bolt 86 which affixes the position of the collar 120 relative to the shaft 114. A limit/tension arm 124 extends from a second aperture 126 in the collar. The distal end of the limit/tension arm 124 is secured to one end of a tension spring 128. The opposite end of the tension spring 128 is secured to a post 130 affixed to the base plate 132 of the jig as shown in FIG. 25. The position of the hold down roller 134 can be adjusted to correspond to the thickness of a work piece by adjusting the relative position of the collar 120 and shaft 114. The outer post 112 further includes a limit/tension arm stop 136 to limit rotation of the shaft 114, arm 124 and vertical hold down roller 134 to avoid contact between the roller 134 and the cutting blade 18 of the equipment. Potential contact between the vertical hold down roller 134 and the cutting blade 18 can also be avoided by repositioning the limit stop 136 into one of a plurality of other apertures 138 in the post 112 or by positioning the anti-kickback device 16 at a position laterally offset from the cutting blade as shown in FIGS. 1A-2 in connection with a table saw 10, and as shown in FIG. 3 in connection with a planer 140.

Figure 80:
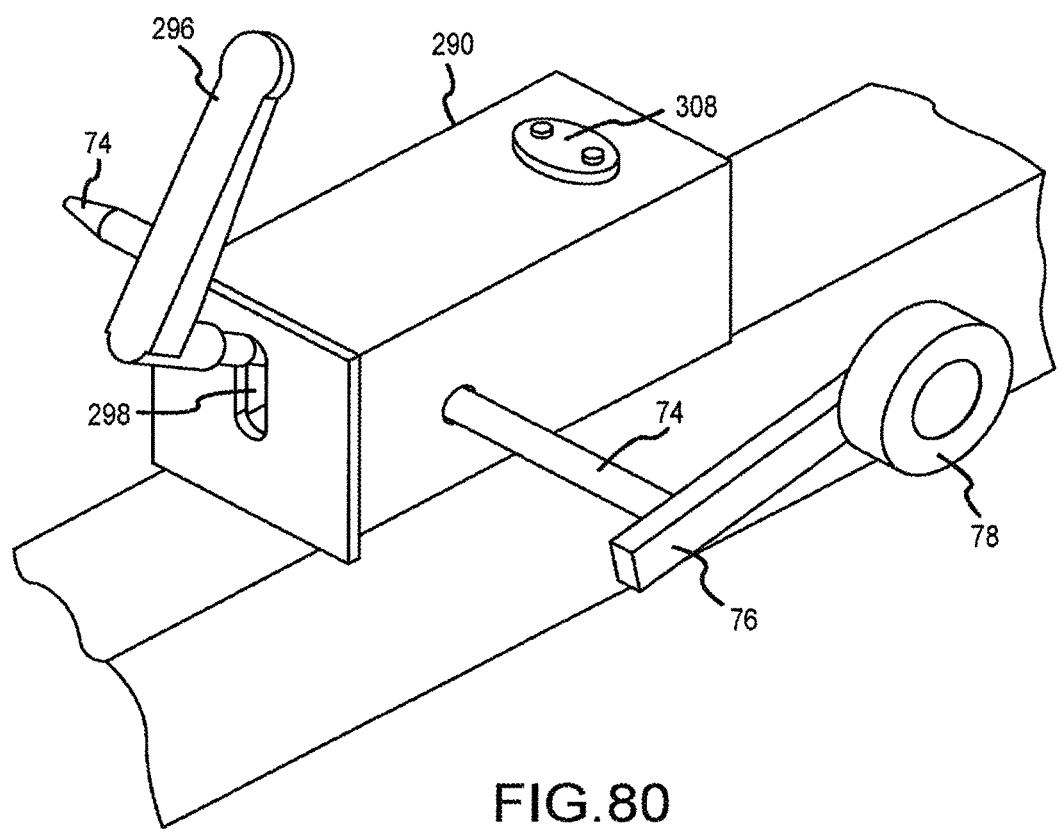
FIG. 80 is a perspective view of the bearing member shown in FIG. 75, oriented on the top of a work piece guide or rip fence.
Figure 89:
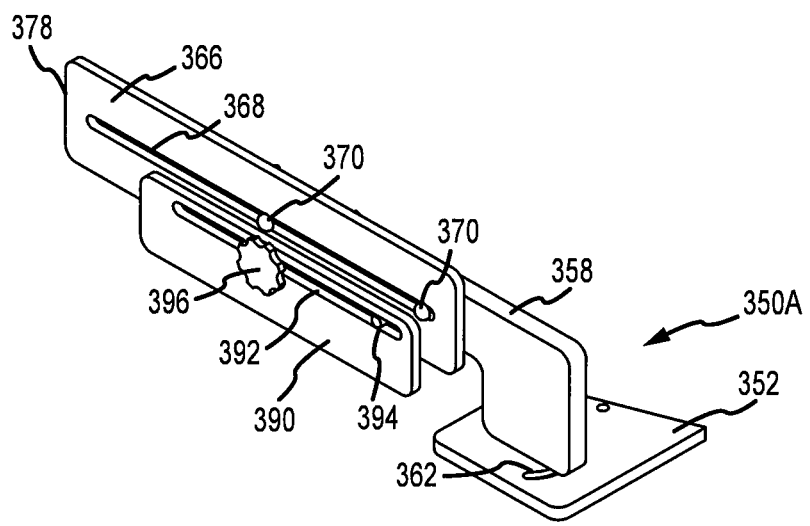
FIG. 89 is a perspective view of one embodiment of a safety device for the left side of a miter saw.
Figure 90:
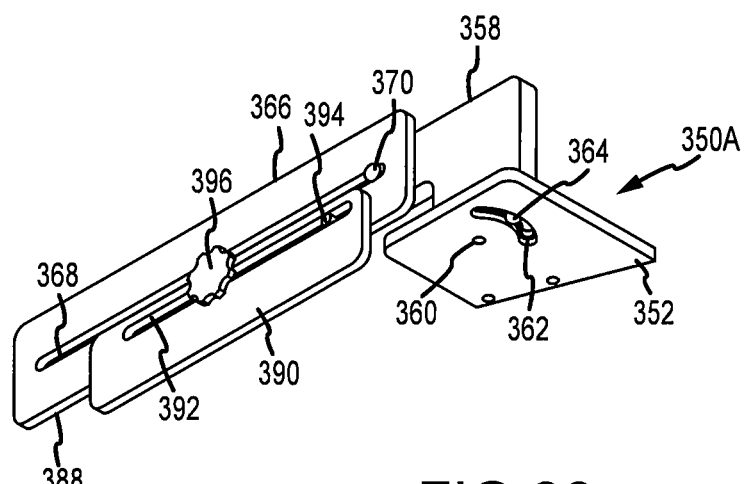
FIG. 90 is a lower perspective view of the device of FIG. 89.
Figure 94A:
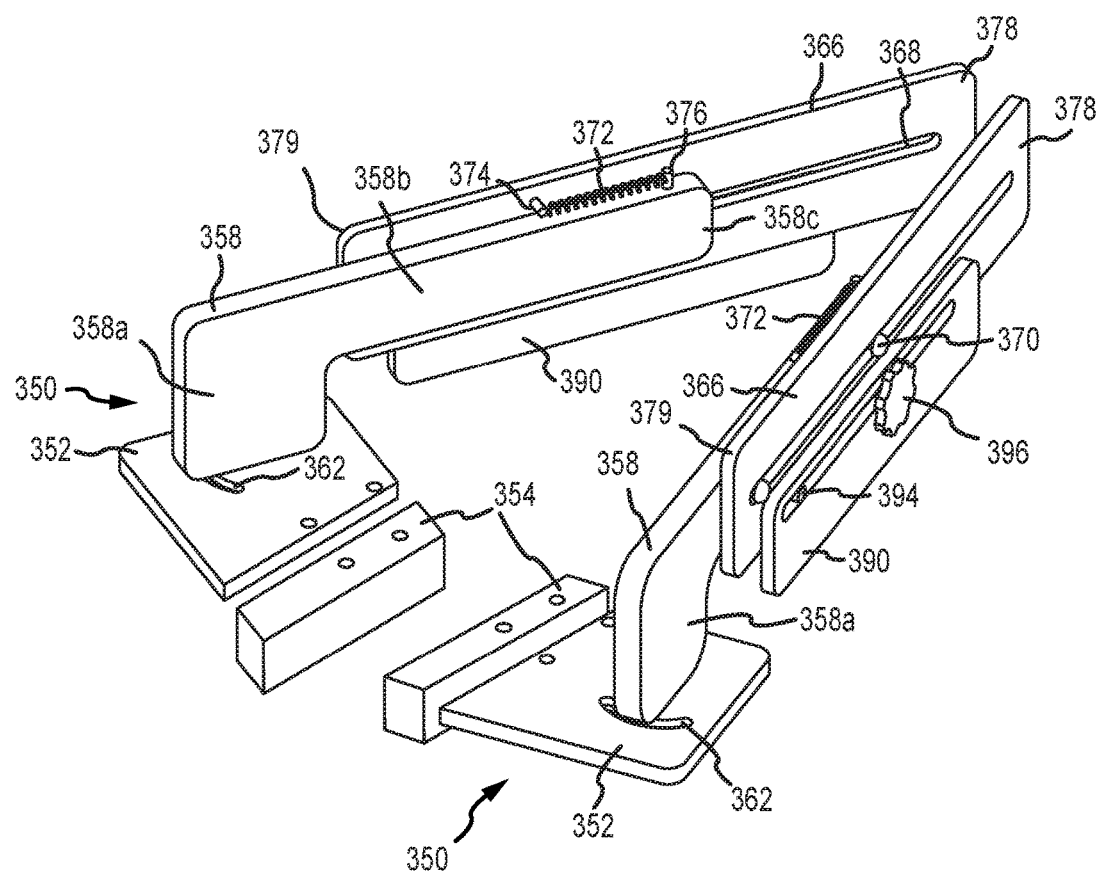
FIG. 94A is a perspective view of one embodiment of two safety devices for use with a miter saw.
Figure 94B:
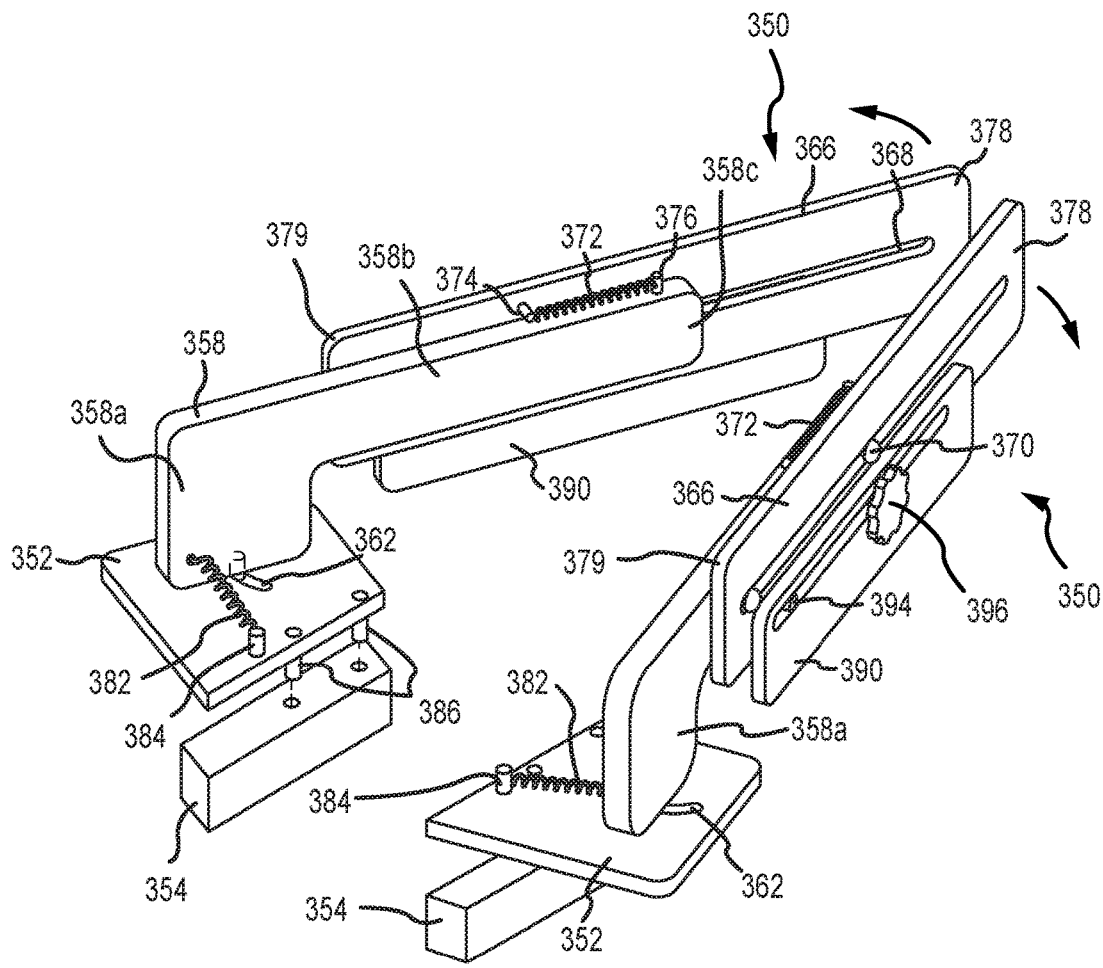
FIG. 94B is a perspective view of a second embodiment of two safety devices for use with a miter saw.
Figure 94C:
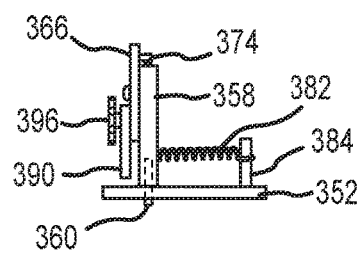
FIG. 94C is an end view of one of the safety devices illustrated in FIG. 94B.

Yet another embodiment of a bearing member for biasing a bearing 78 against a work piece is shown in FIGS. 75-80. The illustrated bearing member may be substituted for the bearing members shown, for example, in FIGS. 17-28. In this alternative embodiment, the collar 80' is positioned inside a bearing housing 291. The bearing housing 291 may be oriented in a variety of positions as desired, for example, connected to a base plate 66 as shown in FIG. 89 or connected to a guide fence as shown in FIG. 80. In this embodiment, a shaft 74 extends through a bore 292 formed in the collar 80'. The housing 290 includes a pair of apertures 294 formed on opposite walls of the housing 291 through which the shaft 74 extends. A bearing arm 76 and bearing wheel 78 extend from the shaft 74. The bearing wheel 78 engages the work piece. A lock bolt 86 having a handle 296 extends through an opening 298 in the removable top cover 300 of the bearing housing 291 The collar 80 includes a threaded aperture (not shown) that receives the threaded end of the lock bolt 86. By tightening the lock bolt 86 into the threaded aperture formed in the collar 80', the lock bolt 86 secures the position of the shaft 74 relative to the collar 80'. An elongate tab 302 extends from the collar 80' and, as illustrated, has a first portion 304 and a second portion 306 angled relative to the first portion 304. The relative orientation of the two portions 304 and 306 may change as desired and there need be only a single portion in some embodiments. A tension spring 90' is positioned between the second portion 306 of the tab 302 and a side wall of the bearing housing 291. The second portion 306 of the tab 302 may optionally include a protrusion or boss (not shown) extending outwardly to receive one end of the spring 90' and assist in positioning the tension spring 90'. A movable cover plate 308 may be positioned over the aperture 310 in the housing wall to access one end of the tension spring 90' and assist in aligning the spring relative to the tab 302 in order for the spring to apply a force against the tab. To increase or decrease the force applied by the bearing wheel 78 on a work piece, the threaded lock bolt 86 is loosened relative to the collar 80', the collar 80 is rotated clockwise or counterclockwise as is appropriate to increase or decrease the compression on the spring 90' and the lock bolt 86 is again tightened.

As shown in FIG. 1A, as a piece of wood or work piece is initially positioned for advancement through the cutting zone of a table saw, the vertical hold down bearing or roller 78, 134 of both the dual bearing hold down device 14 and anti-kickback device 16, respectively, may not be in contact with the work piece. As the work piece is advanced, it will initially cause the vertical bearing 78 of the dual bearing hold down device 14 to rotate to a position on top of the work piece to hold the work piece down vertically as it advances through the cutting zone. Repositioning of the vertical bearing 78 to a position on top of the work piece applies the tension of the tension spring 90 to the work piece to assist in the vertical bearing 78 applying necessary pressure to the top surface of the work piece during the cutting operation. Simultaneously, the horizontal bearing 98 applies inward pressure against the side of the work piece to secure the work piece against the side wall of the rip fence 40. As the work piece further advances through the cutting zone, as shown in FIG. 1B, the leading edge of the work piece passes underneath the vertical hold down roller 134 of the anti-kickback device 16 such that the work piece is now secured on both sides of the cutting zone. Movement of the vertical hold down roller 134 to a position on top of the work piece applies the tension in the tension spring 128 to the work piece to cause the vertical hold down roller 134 to apply a necessary force to the work piece to prevent undesired kicking and jumping during the cutting operation. Regardless of the thickness of the work piece, the pressure applied by the tension springs 78 and 134 remains constant. As shown in FIG. 1C, following complete cut of the work piece, the vertical hold down roller 134 of the anti-kickback device 16 still secures the work piece, prevents kickback and prevents the work piece from falling to the floor and being damaged. The larger the diameter of the roller 134, the more likely it is that the roller 134 will automatically reposition itself to the top of the work piece. It is certainly not desirable for the operator to reach past the active cutting tool for purposes of repositioning a hold down device. In a preferred embodiment, each bearing 78 and 134 have a diameter of at least three inches, and preferably about four inches, which will accommodate work pieces of less than 0.25 to approximately 1.50 inches in thickness.

Figure 33A:
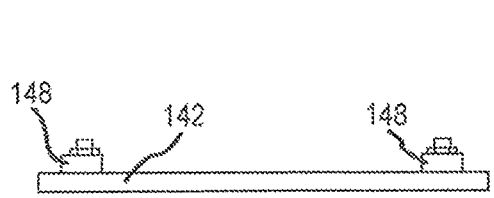
FIG. 33A is a front plan view of the embodiment of FIG. 32A.
Figure 33B:
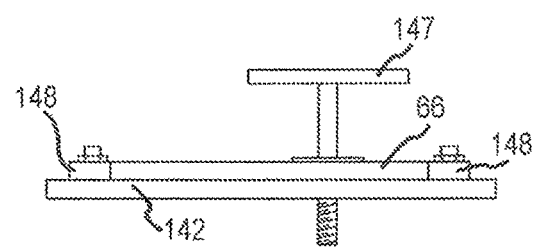
FIG. 33B is a front plan view of the embodiment of FIG. 32B.
Figure 34:
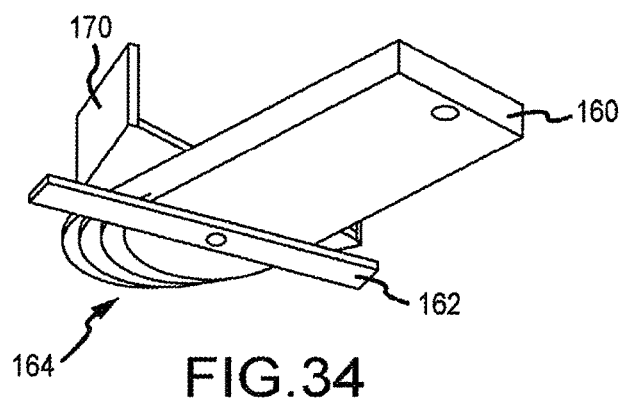
FIG. 34 is a perspective view of one embodiment of a left hand hold down device of the present invention.
Figure 35:
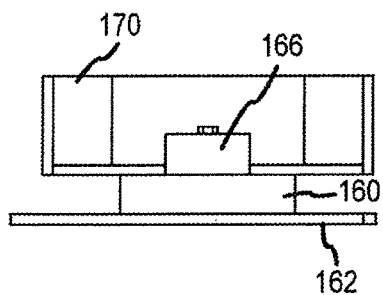
FIG. 35 is a rear plan view of the embodiment of FIG. 34.
Figure 36:
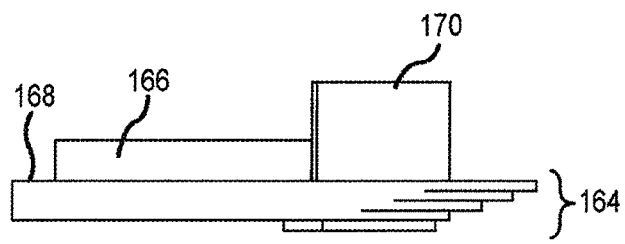
FIG. 36 is a side plan view of the embodiment of FIG. 34.
Figure 37:
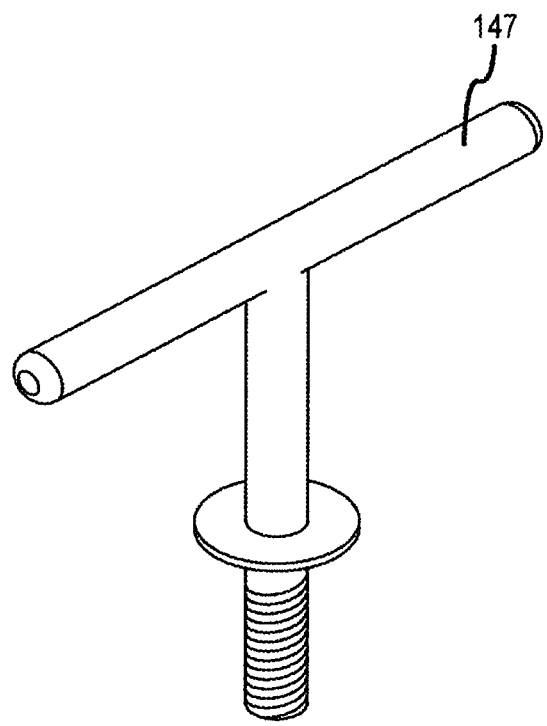
FIG. 37 is a perspective view of one embodiment of a lock down bolt of the present invention.

The bearing hold down device 14, whether in a dual or triple or some other number of bearings configuration, may be attached to a table saw 10 through use of a mounting plate 70 shown in FIGS. 31-33B. The mounting plate comprises a channel bracket 142 designed to fit within the channel 144 on the upper surface 146 of the table of the table saw 10, illustrated in FIGS. 1A-2. A pair of parallel outer guide walls 148 are affixed to the channel bracket 142 and, when connected to the table, rest upon the surface 146 of the table with the channel bracket 142 positioned within the channel 144. An aperture 150 is formed in the channel bracket 142 to provide a means of securing the channel bracket 142 to the table and the hold down device 14 to the mounting plate 70. As shown in FIGS. 32B and 33B, the base plate 66 of the dual bearing hold down device 14 nests between the outer guide walls 148 of the mounting plate 70 and is adjustably positionable relative to the guide walls 148 (see arrows in FIG. 32B). Thus, as illustrated in FIGS. 1A-1C, the base plate 66 of the dual bearing hold down device 14 may be moved towards or away from the rip fence 40 to accommodate work pieces of different widths. Once the position of the base plate 66 is selected, its position may be locked down relative to the table surface 146 by use of a lock bolt 147 positioned in a vertical slot 68 formed in the base plate 66 and secured through the aperture 150 in the channel bracket 142. This is illustrated in FIG. 33B. An embodiment of the lock bolt 152 is shown in FIG. 37. With the dual bearing hold down device 14 in place, repetitious cutting of the identified work pieces may be accomplished without repositioning of the device 14.

A different mounting plate, for use with a planer or jointer 140, is shown in FIGS. 29A-30B. Here, the mounting plate 70 is connected to the surface of the jointer 140 and two parallel upstanding guide walls 154 are formed at the outer edges of the mounting plate 70. Apertures 150 are formed in the mounting plate 70 to receive screws or fasteners to secure the mounting plate 70 to the table of the jointer 140. Another aperture receives a lock bolt 147 to secure the base plate 66 relative to the mounting plate 70. As shown in FIG. 29B, the base plate 66 of the dual bearing hold down device 14 is then positioned between the outer guide walls 154 to allow it to be adjustably positioned relative to the guide wall or rip fence 40 of the planer. See, FIG. 3. In one embodiment, when the dual bearing hold down device 14 is used with a jointer/planer 140, the mounting plate 70 is secured to the surface of the table 146 and positions the base plate 66 of the hold down device 14 at an elevated position directly above the cutting blade (unlike the positioning typically used with a table saw). As a result, the base plate 66 of the hold down device 14 may be positioned above and cover a large portion of the cutting blade, thereby preventing the operator's hand from contacting the blade.

Figure 5:
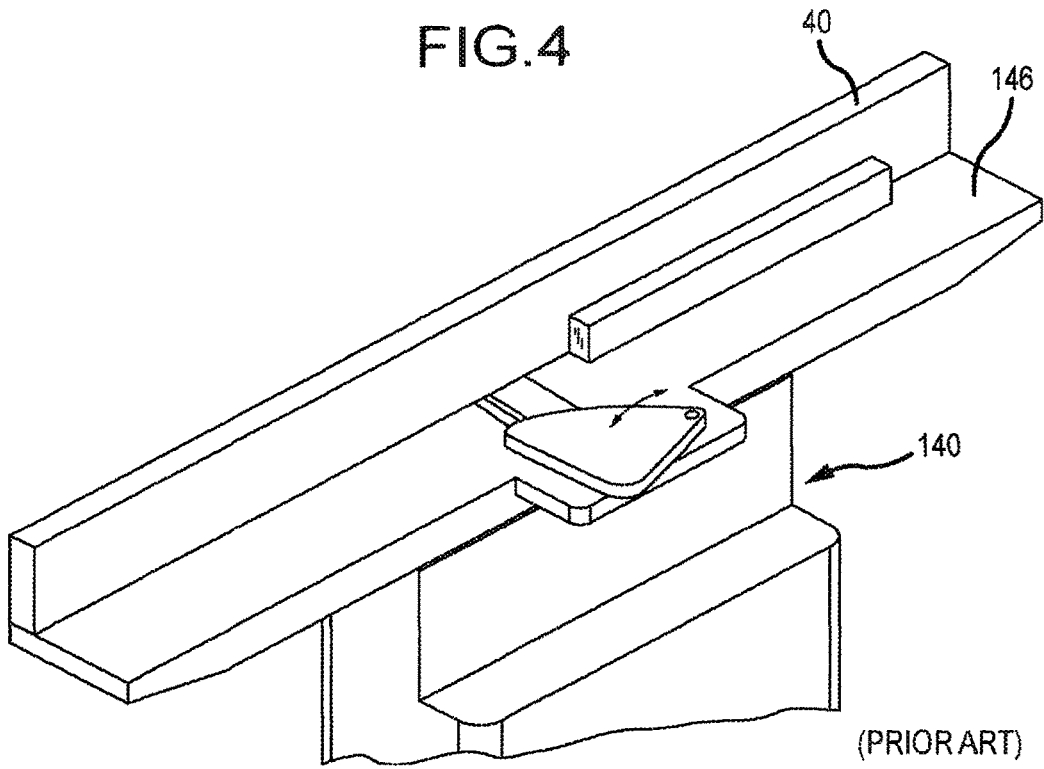
FIG. 5 is a perspective view of a prior art jointer.

A typical jointer/planer 140 is shown in FIG. 5. A rotatable safety plate 156 covers the rotating blade and pivots out of the way as a piece of wood is moved through the cutting zone. However, if an operator's hand were to slip and move into the cutting zone, the safety plate would simply move away as it would with a piece of wood, and nothing would inhibit or prevent the operator's hand from coming in contact with the rotating blade. Embodiments of the present invention substantially reduce this risk.

Figure 6:
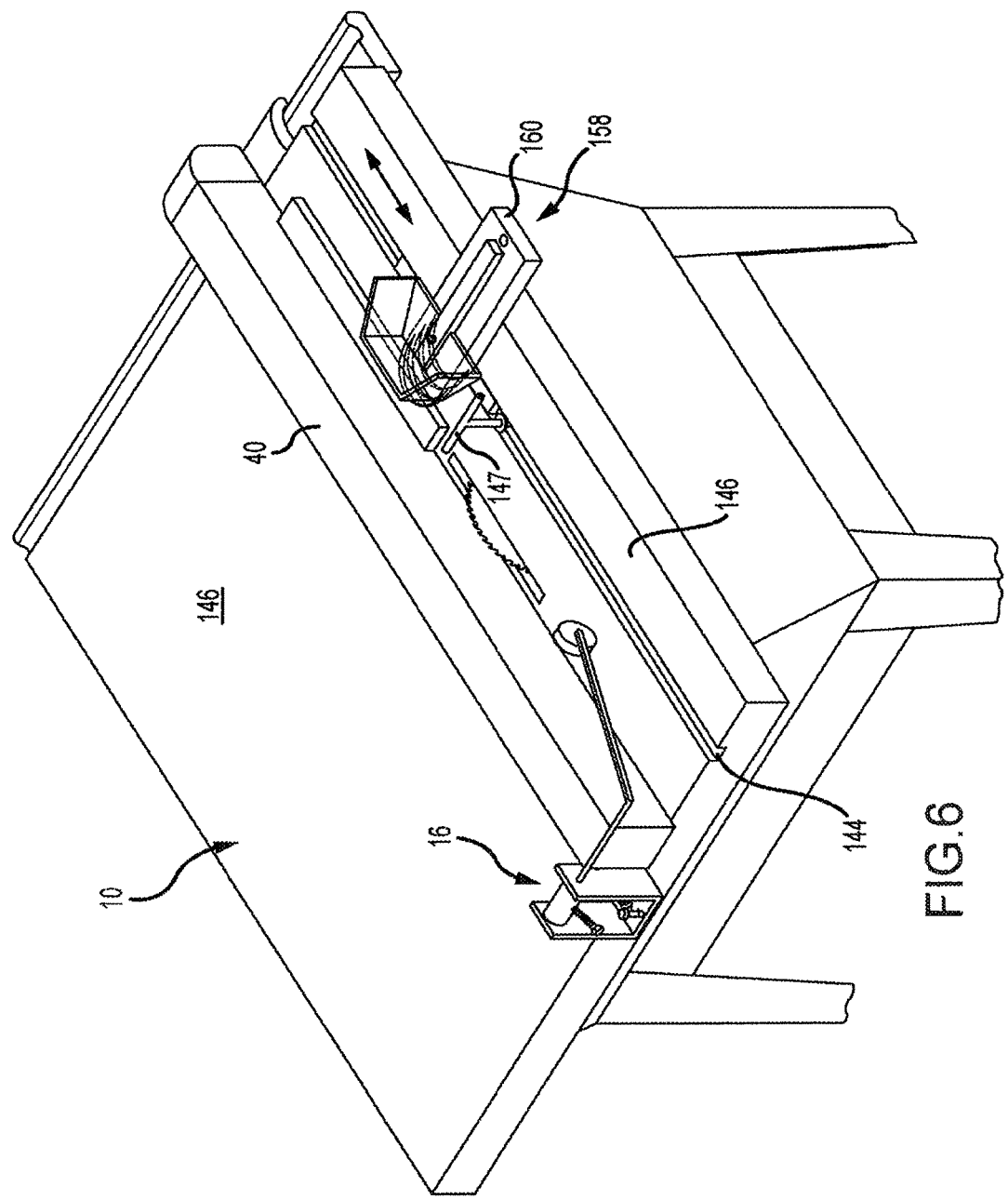
FIG. 6 is a perspective view of a further alternative embodiment of an exemplary safety system of the present invention.
Figure 17:
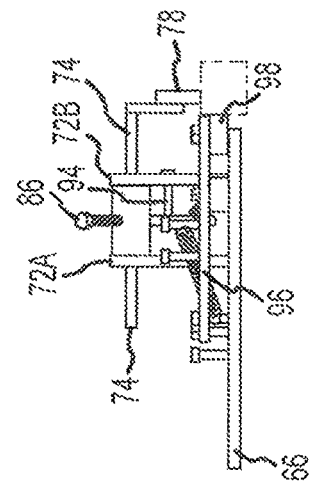
FIG. 17 is a perspective view of one embodiment of a dual bearing hold down device according to the present invention.

A left hand hold down device 158 is shown in FIGS. 6 and 34-36. The left hand hold down device 158 may replace the dual bearing hold down device 14 in connection with operating a table saw. The left hand hold down device comprises a base 160 which is pivotally connected to a channel bracket 162. The channel bracket 162 rides within the channel 144 formed in the upper surface 146 of the table of a table saw 10. The channel bracket 162 may comprise different shapes than the rectangular shape shown in the figures provided it functions to maintain the position of the left hold down device relative to the table. The leading edge of the left hand hold down guide includes a series of stepped or staggered surfaces 164 to accommodate work pieces of different thickness. A handle 166 is formed on the upper surface 168 of the base 160 and a safety wall 170 is formed at the forward edge of the base 160. In operation, as shown in FIG. 6, the channel bracket 162 sits within the channel 144 and allows the left hand work piece device 158 to slide within the channel 144 and rotate relative to the channel bracket 162. A lock bolt 147 is positioned and secured to the channel 144 to prevent advancement of the left hand hold down device 158 into the cutting zone such that there is no contact between the left hand device 158 and the cutting blade. The stepped surface 164 provides both a horizontal surface 164 to hold down a work piece and a vertical surface 164 to press the work piece against the rip fence as the work piece is advanced through the cutting zone. The left hand work piece device 158 may pivot or rotate relative to the channel bracket 142 to accommodate work pieces of different widths. In a preferred embodiment, the stepped surfaces 164 are rounded or semi-circular in profile to maintain constant contact with the work piece at any orientation of the left hand hold down device 158 allowing the tool to rotate while the work piece moves through the cutting zone.

Figure 81:
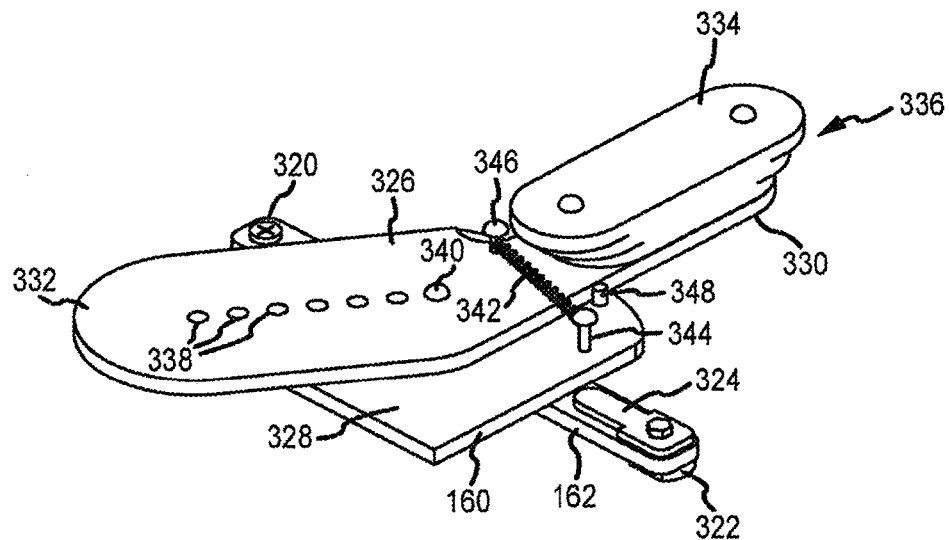
FIG. 81 is a perspective view of an alternative embodiment of a hold down device.
Figure 82:
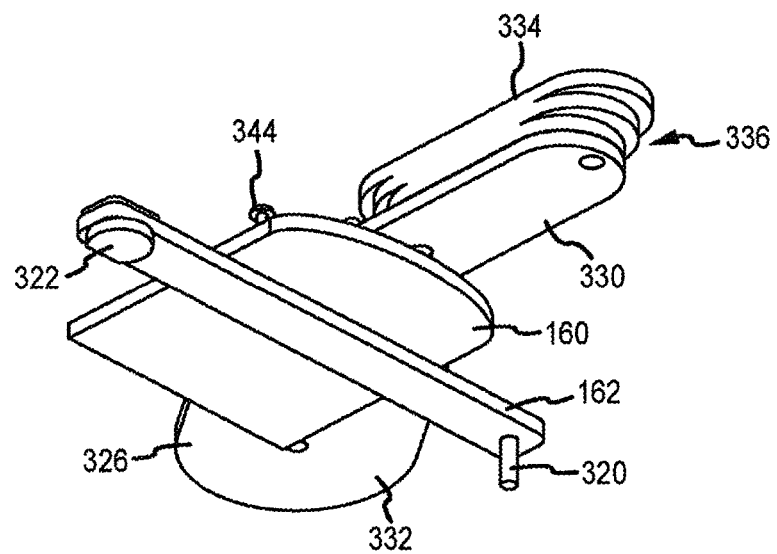
FIG. 82 is a lower perspective view of the hold down device of FIG. 81.
Figure 83:
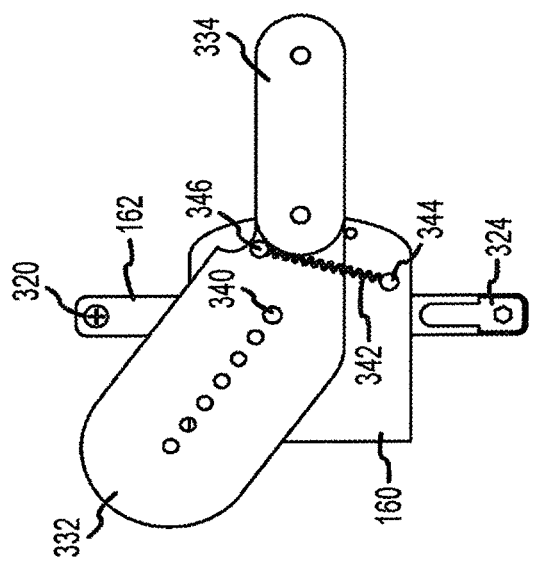
FIG. 83 is a top plan view of the hold down device of FIG. 81.
Figure 85:
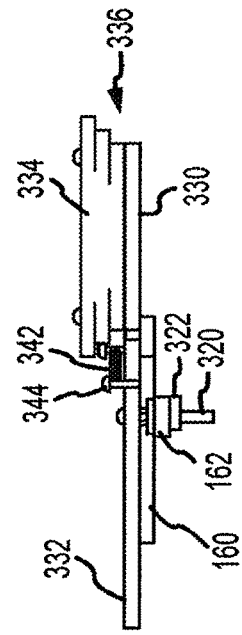
FIG. 85 is an end elevation of the hold down device of FIG. 81.
Figure 84:
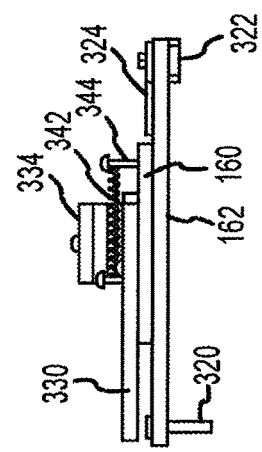
FIG. 84 is a side elevation of the hold down device of FIG. 81.
Figure 86:
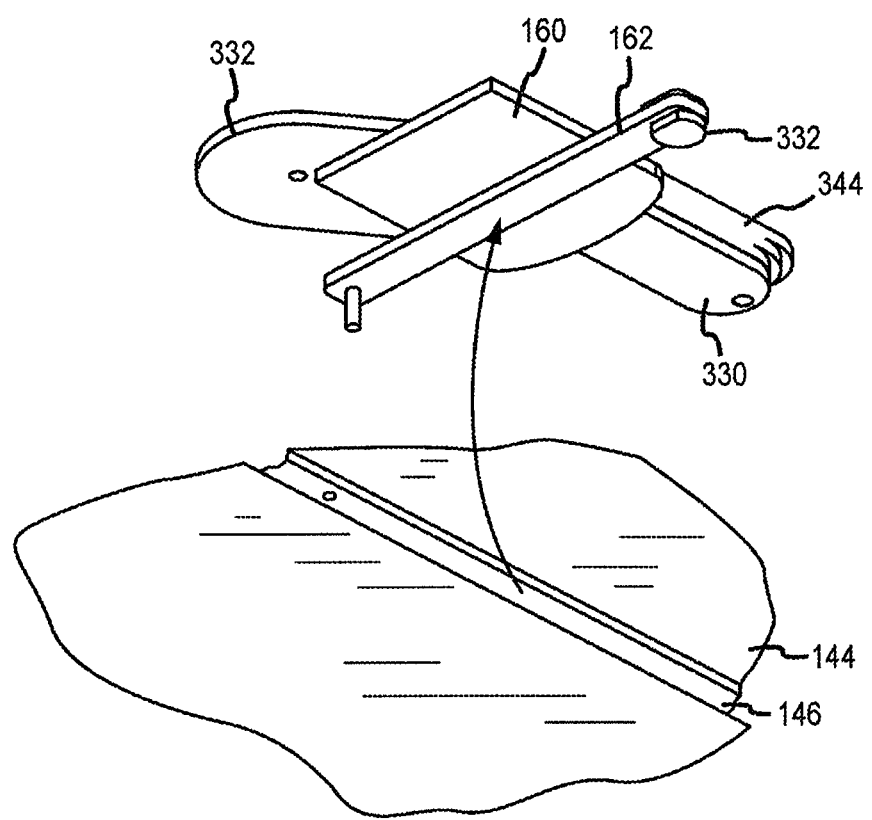
FIG. 86 is a bottom perspective view of the hold down device of FIG. 81, further illustrating how the device attached to a channel in a work surface of a cutting instrument.
Figure 87:
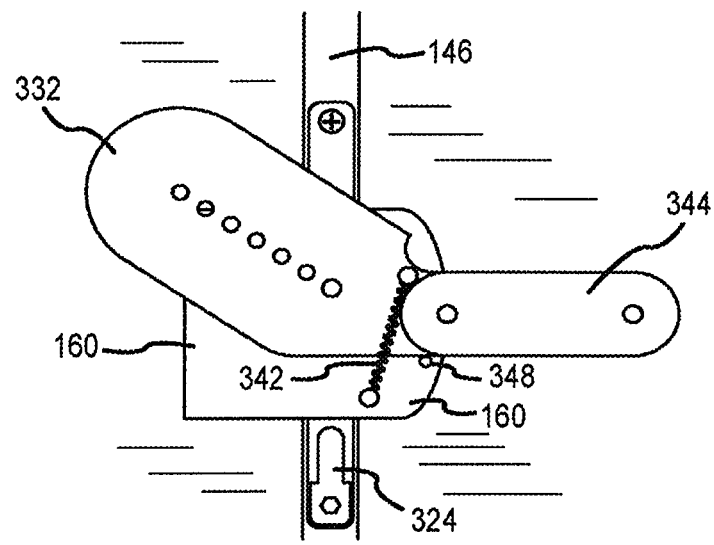
FIG. 87 is a top plan view of the hold down device of FIG. 81, showing the device positioned on the work surface of a cutting instrument.
Figure 88:
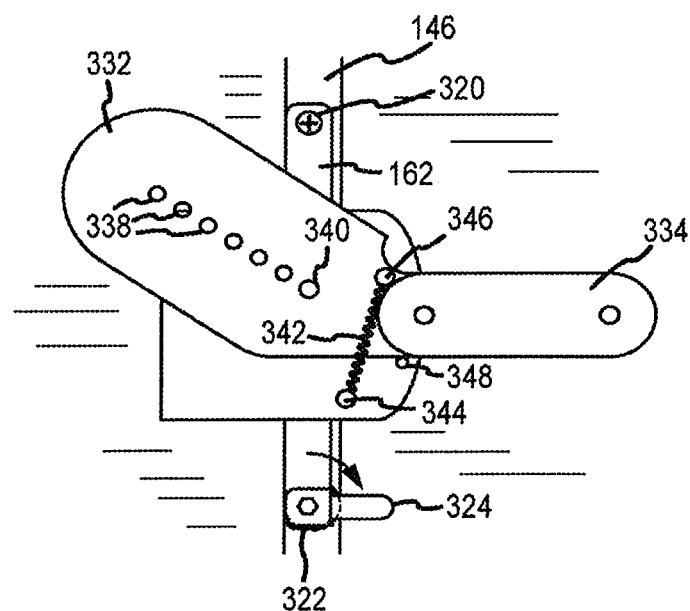
FIG. 88 is a top plan view of the embodiment of FIG. 87, further showing the securing mechanism engaged with the channel of the cutting instrument work surface.

An alternative version of a work piece hold down device is illustrated in FIGS. 81-88. Unlike the hold down device of FIGS. 34-36, this embodiment does not require manual positioning by an operator's left hand. This hold down device comprises a base plate 160 with a channel guide 162 affixed to the lower surface of the base plate 160. The channel guide 162 is dimensioned to fit in a channel typically formed in the work surface of a cutting instrument, such as a table saw. A lock pin 320 extends downwardly from the channel guide 162 and fits in an aperture (not shown) formed in the channel of the work surface. Additionally, a locking cam 322 may optionally be positioned at the opposite end of the channel guide 162 from the lock pin 320 to also assist in securing the hold down device relative to the channel. A lever 324 facilitates rotation of the locking cam 322 and, as shown in FIGS. 87 and 88, by rotating the lever 324, the position of the cam 322 changes relative to the channel to create a friction fit between the cam 322 and the walls of the channel. A pivot plate 326 is pivotally connected to the top surface 328 of the base plate 160. The pivot plate 326 comprises a first portion 330 and a second portion 332. A hold down member 334 is secured to the first portion 330 and includes a series of steps or staggered surfaces 336 for engaging an edge of a work piece. As illustrated, the hold down member 334 has steps 336 formed at each end. The hold down member 334 may be detached from the pivot plate 326 and rotated such that either end of the hold down member 334 may be positioned to engage the work piece. This permits the steps 336 on one end of the hold down member 334 to be differently spaced form the steps 334 on the opposite end, thereby providing a greater variety of work piece sizes that may be engaged, Alternatively, the second end may simply provide a replacement for the first end due to wear and deterioration or damage from the saw over time. The second portion 332 of the pivot plate 160 includes a series of spaced apertures 338. A screw 340 is illustrated as positioned in a first aperture (on the right in FIG. 81) and secures the pivot plate 326 to the base plate 160. Utilizing the different apertures, the pivot plate 326 may be repositioned closer or farther from the cutting blade to accommodate work pieces of different sizes and to accommodate the location of the work surface channel relative to the cutting blade. A biasing member 342, such as a tension spring, is also illustrated as extending between a post 344 secured to the base plate 160 and a post 346 secured to the pivot plate 326. The biasing member 342 biases the position of the hold down member 344 toward a stop member 348 positioned on the base plate. In operation, as a work piece is engaged by the hold down member 344 and moves past a cutting blade, the hold down member 344 and pivot plate 326 may rotate, for example, counterclockwise as illustrated in FIG. 81, due to the linear travel or motion of the work piece. The biasing member 342 assists in maintaining engagement between the stepped surfaces 336 of the hold down member 344 and the work piece during a cutting operation. The stop member 348 orients the hold down member 344 in its initial position once the cutting operation is completed and the work piece is removed. In this manner, repeated similar cuts may be made without having to readjust the position of the hold down member 344, thereby increasing work piece through put and overall efficiency in production. Referring now to FIGS. 38-46, an adjustable safety and securing device 170 primarily for miter saws according to various embodiments of the present invention is shown.

Figure 38:
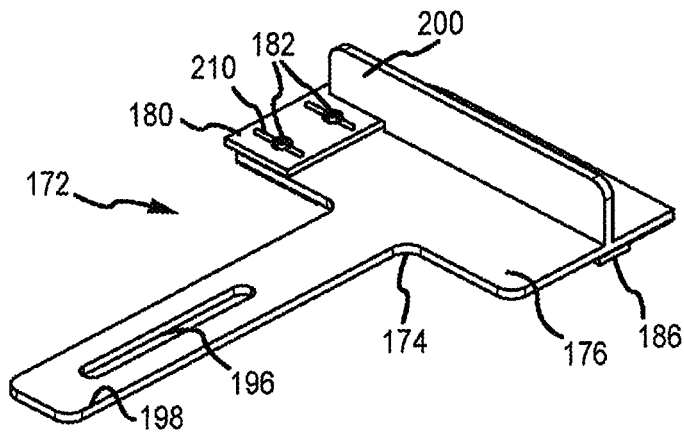
FIG. 38 is a top perspective view of one embodiment of a miter saw hold down device according to the safety system of the present invention.
Figure 39:
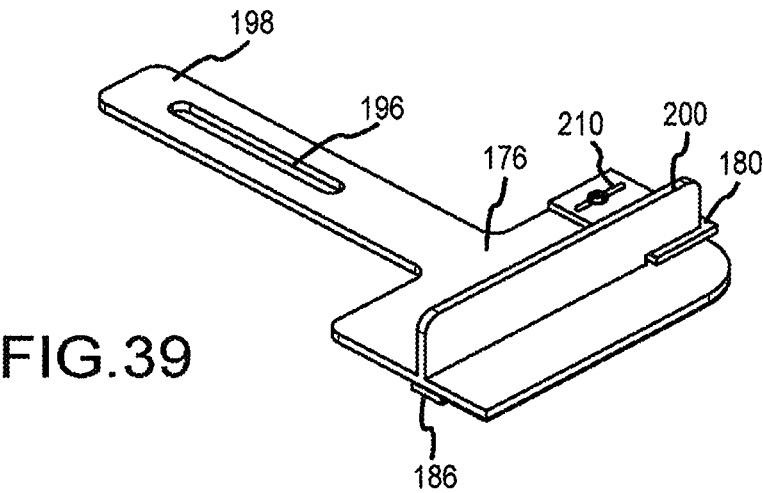
FIG. 39 is an alternative top perspective view of the embodiment of the miter saw hold down device of FIG. 38.
Figure 40:
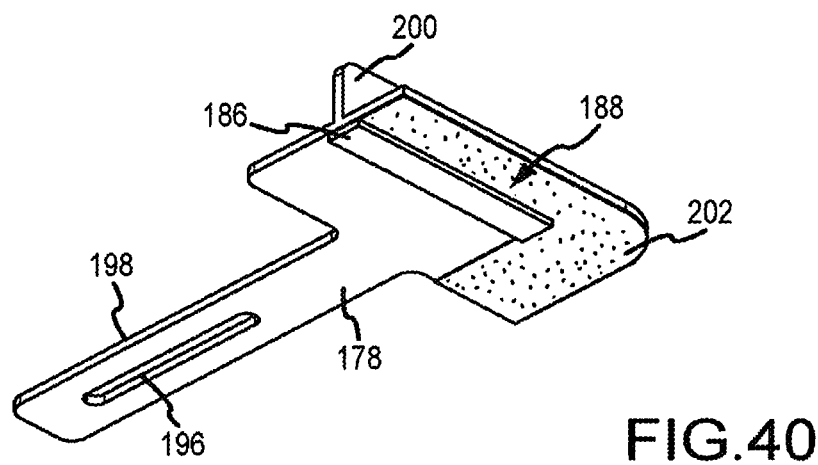
FIG. 40 is a bottom perspective view of the hold down device of FIG. 38.
Figure 41:
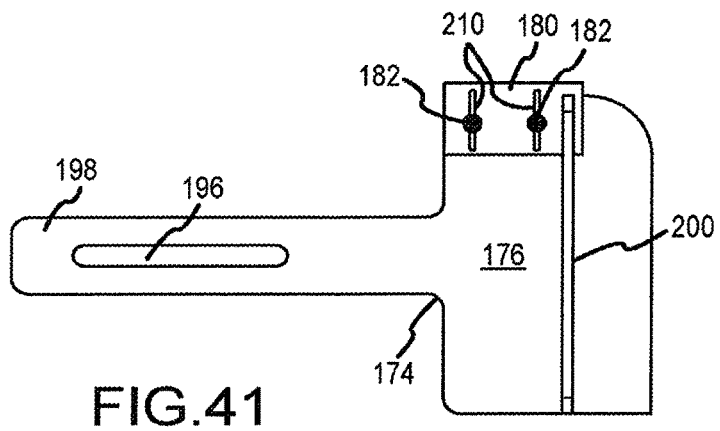
FIG. 41 is a top plan view of the hold down device of FIG. 38.
Figure 42:
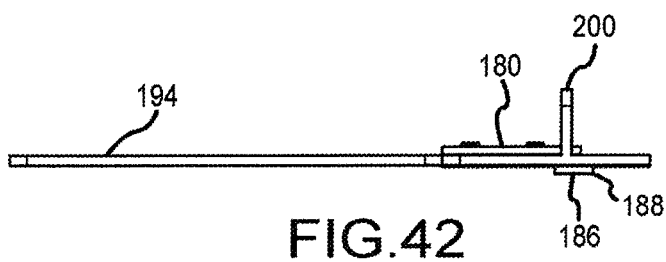
FIG. 42 is a side elevational view of the hold down device of FIG. 38.
Figure 43:
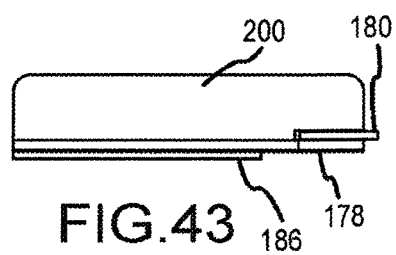
FIG. 43 is an end elevational view of the hold down device of FIG. 38.
Figure 44:
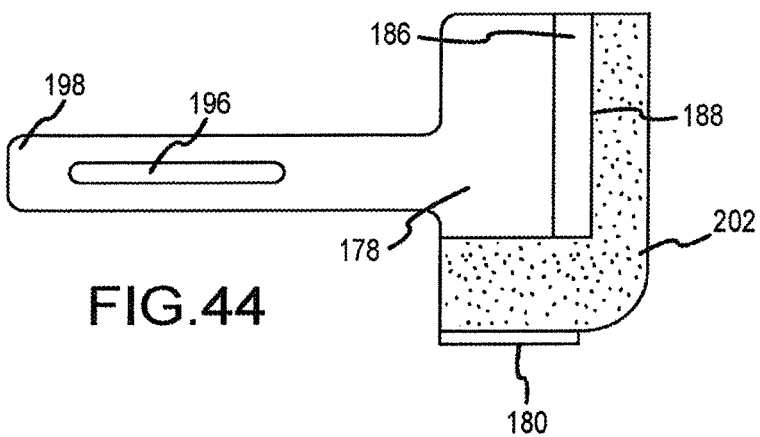
FIG. 44 is a bottom plan view of the hold device of FIG. 38.
Figure 45:
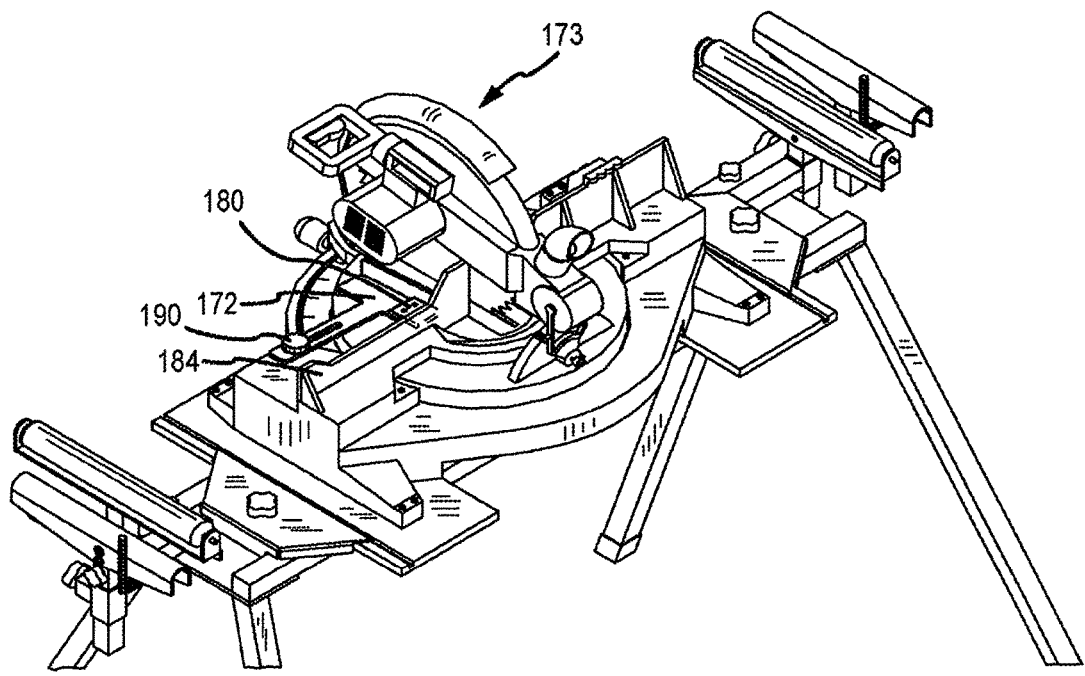
FIG. 45 is a perspective view of the hold down device of FIG. 38 mounted to and used in combination with a miter saw.
Figure 46:
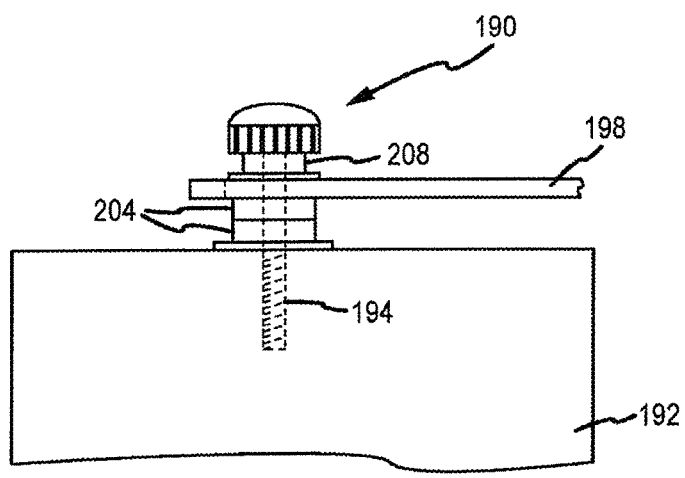
FIG. 46 is a partial elevational view of one embodiment of a lock down mechanism for use with the miter saw hold down device of FIG. 38.
Figure 47:
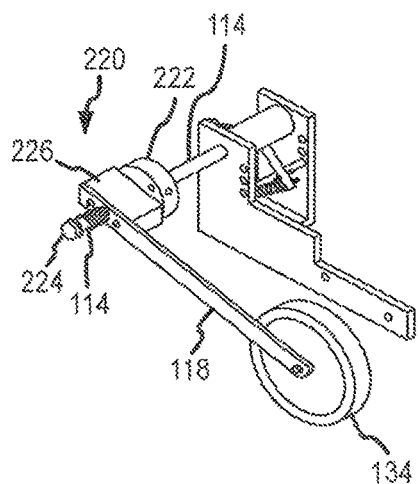
FIG. 47 is a perspective view of an alternative embodiment of an anti-kickback device.
Figure 48:
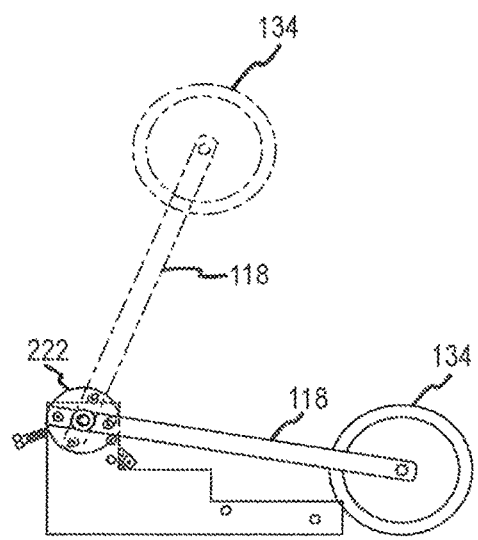
FIG. 48 is a front elevation view of the anti-kickback device of FIG. 47 showing the hold down arm in two alternative positions.
Figure 49:
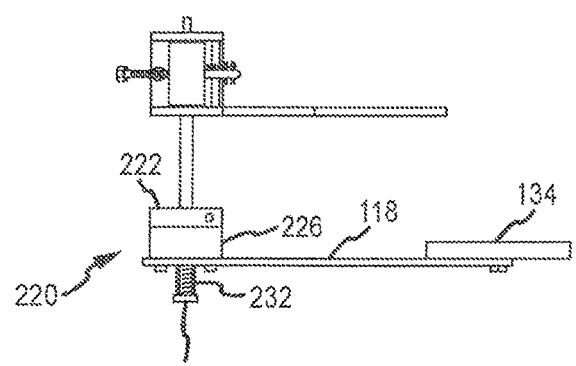
FIG. 49 is a top plan view of the anti-kickback device of FIG. 47.

FIG. 45 is a perspective view of an embodiment of the hold down device 170 mounted on a miter saw 172. FIGS. 38-40 are perspective views of one embodiment of the miter saw hold down device 170. The hold down device 170 comprises a planer body 174, an upper surface 176 and a lower surface 178. As best shown in FIGS. 38 and 41, an alignment plate 180 is adjustably secured to the planar body 174 by alignment screws 182, positioned in adjustment slots, and squarely aligns the planer body 174 with the guide rail 184 of the saw 172. As shown in FIGS. 42-44, guide member 186 extends from the lower surface 178 and provides a guide surface 188 which abuts and assists in aligning the work piece for a desired cut. The guide member 186 comprises a substantially straight edge or surface for contacting a work piece. The guide member 186 prevents the work piece from rotating or moving laterally away from the saw blade while the surface 178 prevents the work piece from moving upwardly relative to the table surface and the guide rail 184 prevents the work piece from moving longitudinally in the direction of the saw blade. The alignment plate 180 can be positioned such that the guide surface 188 of the guide member 186 is parallel to the blade, or it may be positioned such that the guide surface 188 is positioned at a desired angle relative to the blade to make a particular cut.

As shown, the hold down device 170 is secured in place relative to the saw and is positioned such that safe cutting of the work piece is enabled. The hold down device 170 comprises lock means 190 for securing one end of the hold down device 170 to the base or frame 192 of the saw by means of a threaded post 194 secured to the frame 192 and extending through a slot 196 formed in a positioning arm 198. The lower surface 178 of the hold down device 170 rests on an upper surface of the work piece and the guide member 186 is provided on the lower surface 178 such that one edge or surface of the work piece is aligned with and engaged by the rigid member 186. The alignment member 180 is used to align the guide member 186 parallel to the saw blade when the saw blade is positioned at 90 degrees, or at a different angle as may be desired. The hold down device 170 further comprises a safety wall 200 extending upwardly and generally perpendicular to the upper surface 176 of the planar body 174. The safety wall 200 prohibits a user's hand or fingers from contact with the saw blade should the user's hand slip or the work piece kick back.

When the hold down device 170 is aligned to a desired position, the work piece may be secured by applying a downward force upon the upper surface 176 of the hold down device by the operator's left hand to limit or prevent movement of the work piece and the hold down device. As shown in FIG. 44, at least a portion of the lower surface 178 of the hold down device 170 is provided with non-slip material 202, such as sandpaper or rubber, to engage the work piece and limit movement of a work piece. Any number of materials and features including, but not limited to rubber, knurled features, protrusions, etc. may be provided to assist in gripping the work piece.

Use of the hold down device significantly improves the versatility of a miter saw, allowing it to make precise cuts on relatively small work pieces that would previously not be attempted. Cutting a relatively small sized work piece would normally place the operator's hand dangerously close to the saw. However, the present embodiment removes these concerns and protects the operator's hand and fingers. In order to make second or additional cuts, or cuts of a different orientation, including cuts of small work pieces, the saw and/or the hold down device 170 may be re-orientated. For example, the hold down device 170 may be angled with respect to the saw blade and/or the guide fence 184. This may be accomplished, for example, by loosening the lock means 190, angularly adjusting the hold down device 170, and re-securing the lock means 190. The hold down device 170 may also be translated laterally along a path defined by the slot 196 to move the device 170 away from or closer to the blade. As shown in FIG. 45, the position of the hold down device 170 may be adjusted to accommodate work pieces of different thicknesses. Spacers 204 may be positioned on the threaded post 194 below the positioning arm 198. A washer 206 may be positioned underneath the lock nut 208 to provide a better grip for the lock nut 208.

In yet a still further embodiment, a handle may be located in the upper surface 176 to further assist a user in applying force for securing and/or moving the hold down device 170. For example, it is contemplated that a joy-stick-type handle or protrusion be provided projecting upwardly from the upper surface 176. Such a handle is provided for both indicating a safe location for a user's hand(s), as well as facilitating the application of force through an ergonomic feature.

Among the various advantages and benefits of the miter saw hold down device, including the aforementioned safety advantages, is the ability to produce a series of cuts at varying angles, even where the length of such cuts is/are small. The present invention provides a device which allows for freedom of angular movement of a work piece in additional to angular adjustment features provided by a known device, such as a miter saw, thereby vastly improving the versatility of a miter saw.

FIGS. 89-95 illustrate an improved safety system for use with a miter saw. Unlike the device depicted in FIGS. 38-46, which is designed to aid in safely holding a work piece, the invention depicted in FIGS. 89-95 is not designed to hold or secure a work piece. Rather, the system is designed to protect an operator's hand and fingers from injury while operating a miter saw by blocking contact between the user's hand(s) and the blade.

Figure 95:
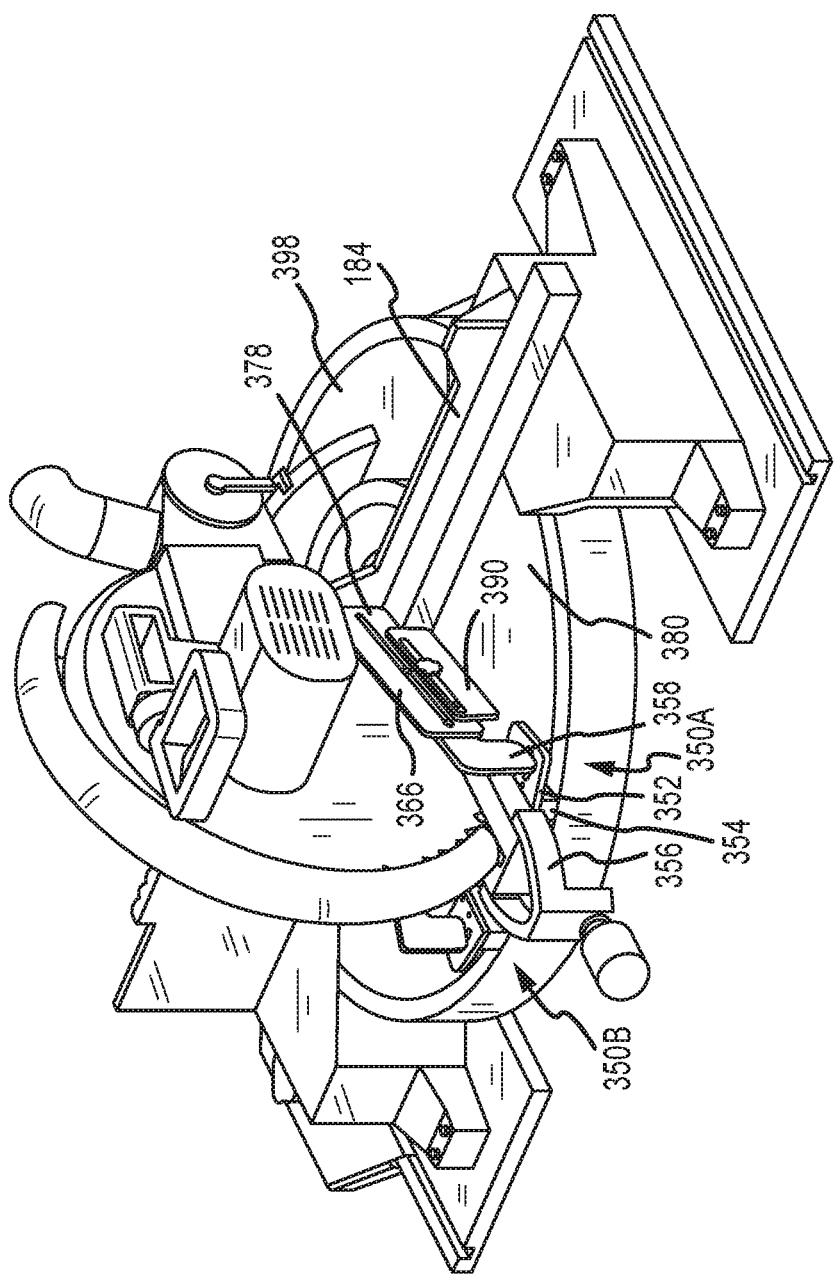
FIG. 95 is a perspective view of a miter saw and work piece, further illustrating the devices of FIG. 94 installed.

In one embodiment, the system comprises two safety devices 350A and 350B. One is installed on the right side of the blade and the other is installed on the left side as illustrated in FIG. 95. Both devices 350A and 350B comprise a base plate 352 that is affixed a mounting bracket 354 (FIG. 94A) secured to opposite sides of the miter saw arm 356. For example, downwardly extending pins 386 may be secured to the base plate 352 (FIG. 94B) and secured within apertures in the mounting bracket 354 to secure the safety device 350 to the mounting bracket 354 without having to lock or clamp the safety device in place. The miter saw arm 356 is part of a table 398 and extends outwardly from and rotates with the table 398 to orient the saw blade at different angles relative to a work piece. A primary support arm 358 is affixed to the base plate 352 at a pivot point 360 which allows the support arm 358 to pivot relative to the base plate 352. The primary support arm has a generally vertically oriented first portion 358a and a second portion or arm 358b that extends generally horizontally from the first portion 358a in a distal direction terminating at distal end 358c. An arcuate slot 362 is formed in the base plate 352 and a locking screw (not shown) extends through the slot 362 from the underneath side and is received in a threaded aperture 364 in the support arm 358. Accordingly, each support arm 358 may be locked in position relative to the base plate 352 at a desired angle relative to the cutting blade and to position the distal end of the devices 350 A and 350 B closer or farther from the blade.

A first safety plate 366 is slideably secured to and extends distally from the distal end 358c of the support arm 358. A longitudinal slot 368 is formed in the first safety plate 366 through which a pair of support pins 370 extend from second portion 358b and are secured to the first plate 366. The first plate 366 moves laterally relative to the support arm 358. A biasing member 372 interconnects the first plate 366 and the support arm 358. In the embodiment illustrated, the biasing member 372 is a coil spring that is connected to a pin 374 secured to the first plate 366 and a pin 376 secured to the support arm 358. The biasing member 372 operates to bias the position of the first plate 366 distally outwardly or away from the base plate 352. The first safety plate 366 has a first distal end 378 and a second proximal end 379. The distal end 378 is designed to contact the vertical surface of the guide fence or alignment wall 184 that extends along the work surface 380 and intersects the cutting zone where the blade is located. Alternatively, instead of being mounted to the saw arm 356 of the table 398, the base plate 352 may be mounted to other portions of the table 398 supporting the surface. Of primary importance is the base plate 352 be attached to a portion of the table that rotates with the cutting blade. As is known to those familiar with miter saws, the position of the saw blade may be moved in order to make angular cuts in a work piece. More particularly, the saw arm 356, table 398, work surface 380 and cutting blade are rotatable from a position perpendicular to the guide fence 184, either to the right or left, through a range of angles. As the saw arm is repositioned, the first plate 366 will maintain contact with the guide fence because of the biasing force of the biasing member 372. For example, as the saw arm is moved to the right in FIG. 95, the first plate 366 on the safety device 350A will be pushed proximally through contact with the guide fence 184 as the angle between the guide fence and the saw blade decreases and the guide fence moves closer and the first plate 366. At the same time, the first plate 366 of safety device 350B, on the opposite side of the saw blade in FIG. 95, will extend outwardly and remain in contact with the guide fence as the guide fence on the opposite side of the cutting blade moves away. Both plates 366 will maintain contact with the guide fence 184 due to the biasing action of the biasing member 372 through a majority of the 180-degree movement of the saw blade.

Alternatively, each support arm 358 may be unlocked relative to the base plate 352 and allowed to pivot or rotate. A locking screw may be positioned in slot 362 to limit the range of motion of the support arms 358, for example, to set a minimum distance between the distal end 378 of the first plate 366 and the saw blade. In addition, the distal end 378 of the first safety plate 366 may be biased outwardly, away from the saw blade, such that as the angle between the first plate 366 and the guide fence 184 decreases below approximately 30 degrees, the distal end 378 of the first safety plate 366 remains in physical contact with or closely adjacent the guide fence 184. This biasing may be accomplished in many ways known to those of skill in the art. For example, FIGS. 94B and C illustrate a biasing member, such as spring 382, positioned on the proximal side of pivot point 360 to exert a pulling force on the proximal end of the primary support arm 358. Different springs having different compressions forces may be substituted as desired, or one end of the spring 382 may be connected to a pin 384 which may be relocated to different positions on the base plate 352 at differently located apertures to alter the compression force of the spring 382.

In addition, the first plate 366 is secured to the support arm 358 in order to form a gap between the bottom edge 388 of the first plate 366 and the work surface. The gap allows a work piece to fit underneath the bottom edge 388 of the first plate 366 but otherwise acts to block a user's hand from contacting the blade.

In addition, a second safety plate 390 may optionally be added to the devices 350 A and 350 B. The second plate 390 is secured to the first plate 366 and extends downward from the first plate 366 toward the work surface to further restrict possible pathways between an operator's hand and the saw. As illustrated in FIG. 95, with or without the second safety plate 390, an operator may hold the work piece and the safety device 350A will be positioned between the blade and the operator's hand. The same is true for safety device 350B on the opposite side of the saw blade. The second plate 390 is also laterally adjustable relative to the first plate 366. A slot 392 is formed in the second plate through which a pin 394 extends from the first plate 366. A securing bolt 396 also extends through the slot 392 and engages a threaded aperture in the first plate 366. By adjusting the position of the second plate 390 relative to the first plate 366, the gap through which the work piece is positioned can be reduced or closed to add further protection to the operator's hands and fingers. For work pieces having a greater height relative to the guide fence 184, spacers (not shown) may be positioned between the support arm 358 and the base plate 352 to increase the height of the gap between the bottom edge of the first plate 366 and the work surface. In addition, a different second plate (not shown) having a greater height may be substituted for the second plate 390 shown in the figures, to reduce the size of the opening beneath the first plate 366.

FIGS. 47-51 disclose an alternative embodiment of an anti-kickback device 16. The embodiment described in connection with FIGS. 23-28 remains essentially the same, but a quick release positioning mechanism 220 has been added. The quick release positioning mechanism 220 is positioned between the shaft 114 and arm 118. The quick release positioning mechanism 220 comprises a first body member 222 affixed to a portion of the shaft 114. In this embodiment, the first body member 222 is disk shaped, although other shapes may be used as will be appreciated by those skilled in the art. The shaft 114 extends through a center aperture in the first body member 222 and terminates in an enlarged end or cap 224. The first body member 222 is fixed to and moves with the rotation of the shaft 114. The quick release positioning mechanism 220 further comprises a second body member 226. In this embodiment, the second body member 226 is block shaped and includes a center aperture through which the shaft 114 also extends. Unlike the first body portion 222, the second body portion 226 is not secured to the shaft 114 other than by virtue of the shaft extending through an aperture in the second body portion 226. The arm 118 is secured to the second body member 226 by a pair of screws or by other means known to those of skill in the art.

Figure 50:
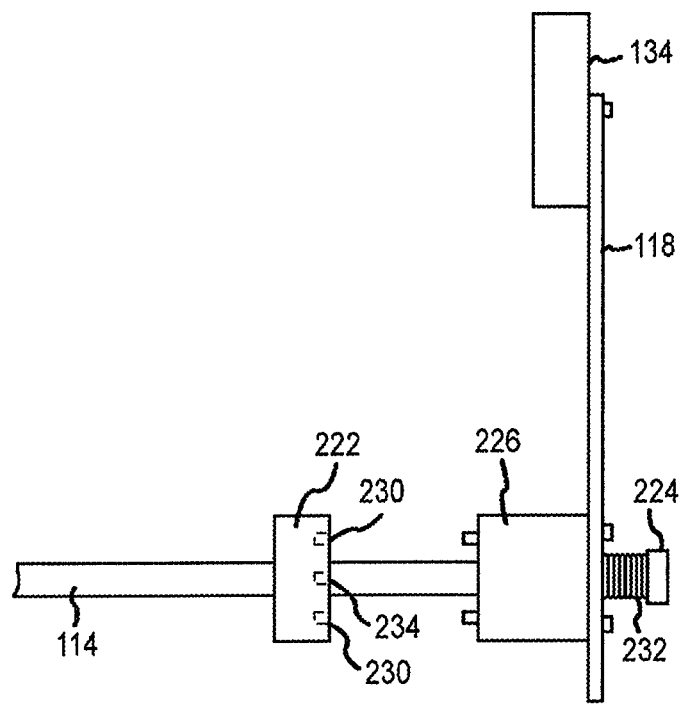
FIG. 50 is a partial top plan view of the anti-kickback device of FIG. 47 showing the first body member of a quick release positioning mechanism separated from the second body member.
Figure 51:
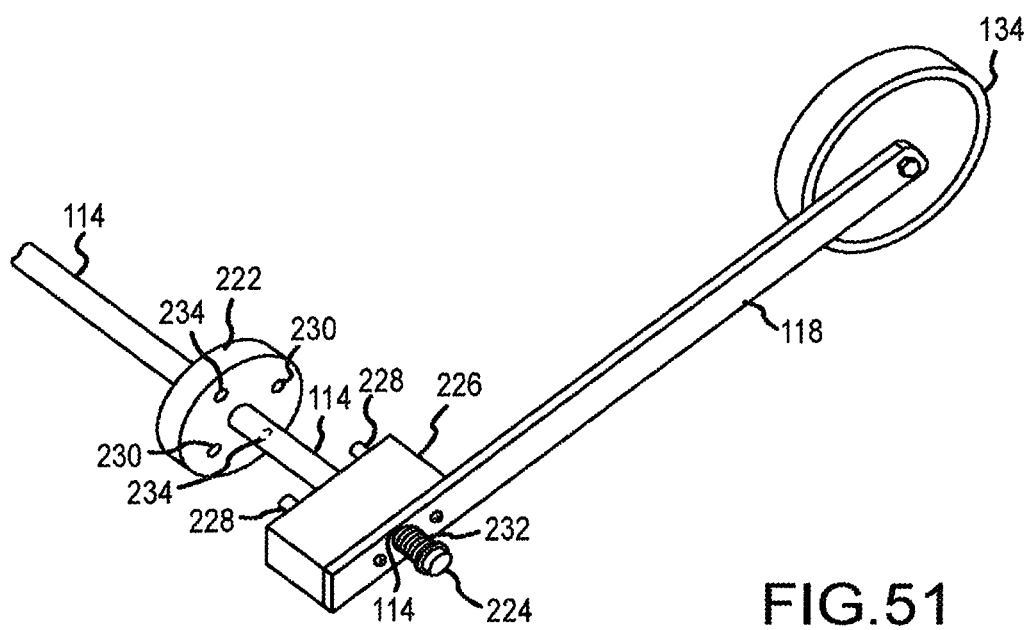
FIG. 51 is a perspective view of the embodiment shown in FIG. 50.
Figure 52:
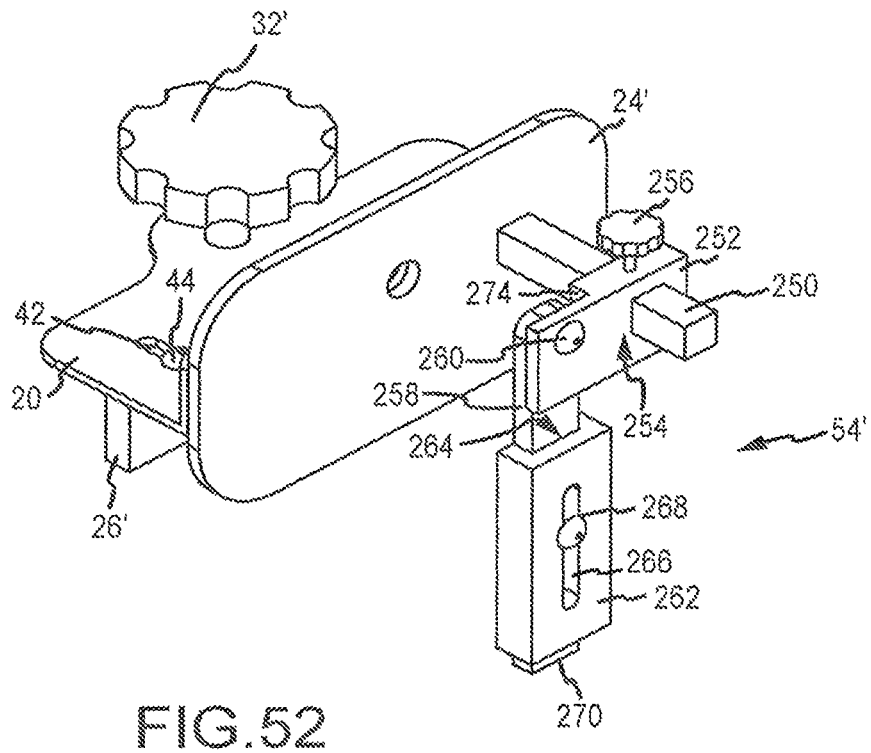
FIG. 52 is an upper perspective view of an alternative embodiment of a right hand push device with an adjustable swing arm.

As shown in FIGS. 50, 51, the second body member 226 includes a plurality of pins 228 that extend laterally out of the second body member 226 and engage receptively configured apertures 230 in the first body member 222. When the pins 228 are secured in the apertures 230, the shaft 114 and arm 118 move in unison. A spring 232 positioned between the arm 118 and cap 224 force the second body member 226 toward the first body member 222. In this manner, the pins 228 remain engaged within the apertures 230 and the first and second body members are secured together and move in unison. If it is desired to position the hold down wheel 134 at a position spaced from the work piece and out of the way, the second body member 226 is moved laterally outwardly against the force of the spring 224 to remove the pins 228 from apertures 230. The second body member 226, arm 118 and wheel 134 are then rotated upwardly until the pins 228 align with apertures 234. The pins 228 are then nested in the apertures 234 by the action of the spring 232 to hold the arm 118 and hold down wheel 134 in a position spaced from the work piece and out of the way.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

While various embodiments of the safety system present invention have been described in detail, it is apparent that modifications and alterations of those embodiments will occur to those skilled in the art. However, it is to be expressly understood that such modifications and alterations are within the scope and spirit of the present invention. In addition, it should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein. Other modifications or uses for the present invention will also occur to those of skill in the art after reading the present disclosure. Such modifications or uses are deemed to be within the scope of the present invention.

What is claimed is:

1. In combination:
    a miter saw having a base, a guide fence, a rotatable work piece supporting surface with an associated movable saw blade assembly, and a positioning arm, the saw blade assembly having a saw blade;
    a first safety device comprising:
        a first base plate removably mounted to the positioning arm of the miter saw on a first side of the saw blade;
        a first support arm pivotally mounted to the first base plate, the first support arm having a first portion directly connected to and extending vertically from the base plate and a second portion extending horizontally from the first portion, the second portion having a distal end positioned closer to the guide fence than the first portion and the second portion movable in a first plane above and parallel to the work piece supporting surface;
        a first safety plate having a first end and a second end, the first safety plate connected and repositionable relative to the first support arm with the first end positioned distally beyond the distal end of the second portion of the first support arm.

2. The combination of claim 1, wherein the first safety plate is biased relative to the first support arm to move the first end of the first safety plate distally away from the distal end of the second portion of the first support arm.

3. The combination of claim 1, further comprising:
    a second safety device comprising:
        a second base plate removably mounted to the positioning arm of the miter saw on a second side of the saw blade opposite the first safety device;
        a second support arm pivotally mounted to the second base plate, the second support arm having a first portion extending vertically from the second base plate and a second portion of the second support arm extending horizontally from the first portion of the second support arm, the second portion of the second support arm having a distal end positioned closer to the guide fence than the first portion of the second support arm and movable in a second plane above and parallel to the work piece workpiece supporting surface;
        a second safety plate having a first end and a second end, the second safety plate connected to and repositionable relative to the second support arm with the first end of the second safety plate positioned distally beyond the distal end of the second portion of the second support arm.

4. The combination of claim 3, further comprising a third safety plate affixed to and extending vertically below the first safety plate, and a fourth safety plate affixed to and extending below the second safety plate.

5. The combination of claim 4, wherein the third and fourth safety plates are repositionable relative to the first safety plate.

6. The combination of claim 3, wherein the second safety device comprises a fourth safety plate having a first end and a second end, the fourth safety plate depending downwardly from the second safety plate and repositionable relative to the second safety plate.

7. The combination of claim 3, wherein the second safety plate is biased relative to the second support arm to move the first end of the second safety plate distally away from the distal end of the second portion of the second support arm.

8. The combination of claim 3, wherein the second safety plate is slideably affixed to the second portion of the second support arm and is distally and proximally repositionable relative to the second portion of the second support arm.

9. The combination of claim 8, wherein the first end of the second safety plate is biased relative to the second support arm, and wherein as the saw blade is repositioned relative to the guide fence the first end of the second safety plate remains located proximate the guide fence.

10. The combination of claim 9, further comprising a spring interconnecting the second safety plate to the second support arm to bias the first end of the second safety plate distally away from the distal end of the second portion.

11. The combination of claim 1, wherein the first safety device comprises a third safety plate having a first end and a second end, the third safety plate depending downwardly from the first safety plate and repositionable relative to the first safety plate.

12. The combination of claim 1, further comprising a third safety plate affixed to and extending vertically below the first safety plate.

13. The combination of claim 12, wherein the third safety plate is repositionable relative to the first safety plate.

14. The combination of claim 1, wherein the first safety plate is slideably affixed to the second portion of the first support arm and is distally and proximally repositionable relative to the second portion of the first support arm.

15. The combination of claim 14, wherein the first end of the first safety plate is biased relative to the first support arm, and wherein as the saw blade is repositioned relative to the guide fence the first end of the first safety plate remains located proximate the guide fence.

16. The combination of claim 14 further comprising a spring interconnecting the first safety plate to the first support arm to bias the first end of the first safety plate distally away from the distal end of the second portion of the first support arm.

17. The combination of claim 1, further comprising a first mounting bracket connected to the positioning arm of the miter saw, and wherein the first base plate of the first safety device is removably attached to the first mounting bracket.

18. In combination:
a miter saw having a base, a guide fence, a rotatable work piece supporting surface with an associated positioning arm, and a movable saw blade assembly;
a first safety device mounted to the positioning arm of the miter saw on a first side of the saw blade assembly, the first safety device having a first support arm that pivots in a first plane above and parallel to the work piece supporting surface, the first support arm having a first end and a second end and wherein the first end of the first support arm is oriented closer to the guide fence than the second end of the first support arm, the first safety device having a first safety plate having a first end and a second end, the first safety plate movably connected to the first support arm with the first end of the first safety plate positioned distally beyond the first end of the first support arm, and the first safety device having a first biasing member to bias the first end of the first safety plate distally away from the first end of the first support arm.

19. The combination of claim 18, wherein the first and second ends of the first support arm define a longitudinal axis, and the first safety plate moves along the longitudinal axis.

20. The combination of claim 18, wherein the first safety plate has a bottom surface, and the bottom surface is spaced from the supporting surface to from a first gap between the bottom surface of the first safety plate and the supporting surface, and wherein a work piece is positioned in the first gap during a cutting operation of the saw blade assembly.

21. The combination of claim 18, wherein the first biasing member is a spring interconnecting the first support arm and the first safety plate.

22. The combination of claim 18, further comprising:
a second safety device mounted to the positioning arm of the miter saw on a second side of the saw blade assembly opposite the first safety device, the second safety device having a second support arm that pivots in a second plane above and parallel to the work piece supporting surface, the second support arm having a first end and a second end and wherein the first end of the second support arm is oriented closer to the guide fence than the second end of the second support arm, the second safety device having a second safety plate having a first end and a second end, the second safety plate movably connected to the second support arm with the first end of the second safety plate positioned distally beyond the first end of the second support arm, and the second safety device having a second biasing member to bias the first end of the second safety plate distally away from the first end of the second support arm.

23. The combination of claim 22, wherein the first and second ends of the second support arm define a longitudinal axis, and the second safety plate moves along the longitudinal axis.

24. The combination of claim 22, wherein the second safety plate has a bottom surface, and the bottom surface is spaced from the supporting surface to from a second gap between the bottom surface of the second safety plate and the supporting surface and wherein a work piece is positioned in the second gap during a cutting operation of the saw blade assembly.

25. The combination of claim 22, wherein the second biasing member is a spring interconnecting the second support arm and the second safety plate.

26. The combination of claim 22, further comprising a fourth biasing member to bias the first end of the second safety plate away from the saw blade assembly.

27. The combination of claim 18, further comprising a third biasing member to bias the first end of the first safety plate away from the saw blade assembly.

* * * * *